US012810090B2

(12) United States Patent
Van Rijnberk et al.

(10) Patent No.: US 12,810,090 B2
(45) Date of Patent: Nov. 24, 2026

(54) ARTICLE PROCESSING APPARATUS, SYSTEM AND METHOD THEREFOR

(71) Applicant: SITA B.V., Rotterdam (NL)

(72) Inventors: Jeroen Van Rijnberk, Rotterdam (NL); Reinier Honore Pas, Rotterdam (NL); Sebastian De Groot, Rotterdam (NL); Swen Van Klaarbergen, Rotterdam (NL); Willem Albertus Van Der Tuuk, Rotterdam (NL)

(73) Assignee: SITA B.V., Rotterdam (NL)

( * ) Notice: Subject to any disclaimer, the term of this patent is extended or adjusted under 35 U.S.C. 154(b) by 0 days.

(21) Appl. No.: 18/927,062

(22) Filed: Oct. 25, 2024

(65) Prior Publication Data

US 2025/0053762 A1 Feb. 13, 2025

Related U.S. Application Data

(63) Continuation of application No. PCT/EP2023/061406, filed on Apr. 28, 2023.

(30) Foreign Application Priority Data

Apr. 29, 2022 (GB) ..................................... 2206350
Nov. 4, 2022 (GB) ..................................... 2216475
(Continued)

(51) Int. Cl.
*G06K 15/00* (2006.01)
*G06K 7/10* (2006.01)
(Continued)

(52) U.S. Cl.
CPC ..... *G06K 7/10861* (2013.01); *G06K 7/10128* (2013.01); *G06K 7/10356* (2013.01);
(Continued)

(58) Field of Classification Search
CPC ............. G06K 7/10722; G06K 7/1413; G06K 7/10861; G06K 7/1417; G06K 7/10732;
(Continued)

(56) References Cited

U.S. PATENT DOCUMENTS 6,839,133 B2 * 1/2005 Gehring .................. G01V 8/10 356/141.5
8,297,435 B2 * 10/2012 Lathem ..................... A61L 2/10 250/455.11
(Continued)

FOREIGN PATENT DOCUMENTS

CN 2044440411 U 7/2015
CN 107679438 A 2/2018
EP 2741230 * 6/2014 ......... G06K 7/10445

OTHER PUBLICATIONS

Examination Report issued in Application No. GB2216482.6, dated Aug. 19, 2026 (3 pages).

*Primary Examiner* — Daniel St. Cyr
(74) *Attorney, Agent, or Firm* — Bradley Arant Boult Cummings LLP; Adam J. Thompson, Esq.; Daniel E. Sineway, Esq.

(57) ABSTRACT

A system for reading a tag comprising a barcode, the tag being attached to an item to be processed, the system comprising: a plurality of cameras each having a field of view directed towards a same surface from differing angles; and processing means configured to read the barcode using the plurality of cameras, the item to be processed being disposed on the surface to which each of the plurality of cameras directs their field of view.

20 Claims, 17 Drawing Sheets

(30) Foreign Application Priority Data

Nov. 4, 2022 (GB) ..................................... 2216480
Nov. 4, 2022 (GB) ..................................... 2216482

(51) Int. Cl.
*G06K 7/14* (2006.01)
*G06T 7/62* (2017.01)
*G06T 7/64* (2017.01)
*B65G 43/00* (2006.01)

(52) U.S. Cl.
CPC ....... *G06K 7/10445* (2013.01); *G06K 7/1413* (2013.01); *G06T 7/62* (2017.01); *G06T 7/64* (2017.01); *B65G 43/00* (2013.01); *G06T 2207/10028* (2013.01); *G06T 2207/10048* (2013.01); *G06T 2207/30112* (2013.01)

(58) Field of Classification Search
CPC ............. G06K 7/1443; G06K 7/10415; G06K 7/10128; G06K 7/10445; G06K 7/10356; G06T 7/64; G06T 7/62
USPC ..................................................... 235/462.14
See application file for complete search history.

(56) References Cited

U.S. PATENT DOCUMENTS

| | | | | | |
|---|---|---|---|---|---|
| 9,004,359 | B2 * | 4/2015 | Shearin | G06K 7/1096 | 235/462.43 |
| 12,099,892 | B2 * | 9/2024 | Markman | G06K 7/10297 | |
| 2009/0134221 | A1 * | 5/2009 | Zhu | G06K 7/10544 | 235/462.14 |
| 2012/0218081 | A1 * | 8/2012 | Blake | G06K 7/10356 | 340/10.1 |
| 2013/0306727 | A1 * | 11/2013 | Shearin | G06K 7/10 | 235/440 |
| 2015/0097032 | A1 * | 4/2015 | Olmstead | G06K 7/10861 | 235/440 |

* cited by examiner

A B C

| | No Object | Ok | Multiple Objects | Non Conveyable | Tub Detected |
|---|---|---|---|---|---|
| Correct | 6 | 88 | 6 | 57 | 5 |
| Incorrect | 0 | 8 | 3 | 5 | 0 |
| Total | 6 | 96 | 9 | 62 | 5 |
| Percentage | 100 | 91.66666667 | 66.66666667 | 91.93548387 | 100 |

A

| | OK* | NOK** | TOTAL |
|---|---|---|---|
| Correct | 93 | 69 | 162 |
| Incorrect | 8 | 9 | 17 |
| Total | 101 | 78 | 179 |
| Percentage | 92.07921 | 88.46154 | 90.50279 |

B

| | No Object | Ok | Multiple Objects | Non Conveyable | Tub Detected | Reposition |
|---|---|---|---|---|---|---|
| Correct | 3 | 91 | 5 | 3 | 1 | 1 |
| Incorrect | 3 | 5 | 4 | 59 | 4 | 0 |
| Total | 6 | 96 | 9 | 62 | 5 | 1 |
| Percentage | 50 | 94.79166667 | 55.55555556 | 4.838709677 | 20 | 100 |

A

| | OK* | NOK** | TOTAL |
|---|---|---|---|
| Correct | 92 | 12 | 104 |
| Incorrect | 9 | 66 | 75 |
| Total | 101 | 78 | 179 |
| Percentage | 91.08911 | 15.38462 | 58.10056 |

B

ARTICLE PROCESSING APPARATUS, SYSTEM AND METHOD THEREFOR

CROSS-REFERENCE TO RELATED APPLICATIONS

This application is a continuation of International App. No. PCT/EP2023/061406, filed Apr. 28, 2023, and entitled "ARTICLE PROCESSING APPARATUS, SYSTEM AND METHOD THEREFOR," which claims the benefit of, and priority to: Great Britain Patent App. No. 2206350.7, filed Apr. 29, 2022; Great Britain Patent App. No. 2216475.0, filed Nov. 4, 2022; Great Britain Patent App. No. 2216480.0, filed Nov. 4, 2022; and Great Britain Patent App. No. 2216482.6, filed Nov. 4, 2022, the disclosures of which are each hereby incorporated by reference as if set forth herein in their entireties.

FIELD OF THE INVENTION

This invention relates to a system for processing articles. In particular, but not exclusively, this invention relates to a system, apparatus, and method for processing articles such as an item of baggage or an item such as a parcel which may be processed at airports, seaports, railways, and other mass transport locations with an item handling system. The system or apparatus may be retrofitted to an existing system or apparatus which is already installed at a particular location.

BACKGROUND OF THE INVENTION

At transportation hubs, such as airports, items of luggage that are to be checked in need to processed in a number of ways at the point of drop off. For example, said items of luggage will often have attached a bag tag, the bag tag holding information about the baggage journey in the form of radio-frequency identification (RFID) tags and/or visual barcodes. Said baggage journey may be linked to a passenger name record/passenger journey, but not exclusively. Such tags need to be read at the point of drop off to retrieve this information. Furthermore, after having been dropped off, the item of luggage will often be conveyed along a path from the point of drop off to a destination where it will be sorted for loading onto a mode of transport, such as an aircraft. The item will often be conveyed by way of a conveyor belt and it is, therefore, important to assess whether the item is suitable to be conveyed in such a way. For example, items of luggage that are too round in shape may roll of the belt as they are being conveyed. Items that are irregular in shape may damage or get stuck on the belt.

Typically, for the above described processing, a manual operator is required at the point of drop off to ensure that the bag tags are successfully read and that the item of luggage is suitable to be conveyed. Existing infrastructure at drop off points reflects this. However, there has been a general move towards self-service processes at transportation hubs to increase the efficiency of the passenger experience.

The inventors of the present invention have appreciated that there is a need for apparatus that can facilitate the processing of items of luggage at self-service drop-off points that can be retrofitted to existing infrastructure.

SUMMARY OF THE INVENTION

The invention is defined by the independent claims below to which reference should now be made. Optional features are set forth in the dependent claims.

According to an aspect of the present invention there is provided a system for reading a barcode attached to an item to be processed, the system comprising: a plurality of cameras each having a field of view directed towards a same surface from differing angles; and processing means configured to read a barcode attached to an item to be processed using the plurality of cameras, the item to be processed being disposed on the surface to which each of the plurality of cameras directs their field of view. This provides the advantage of looking at the item and, therefore, the attached tag from multiple angles, increasing the likelihood that a barcode will be read regardless of how the item is positioned on the surface. The read rate of the system is, therefore, increased.

BRIEF DESCRIPTION OF THE DRAWINGS

An embodiment of the invention will now be described, by way of example only, and with reference to the accompanying drawings, in which.

Like features are denoted by like reference numerals.

DETAILED DESCRIPTION

The following exemplary description is based on a system, apparatus, and method for use in the aviation industry. However, it will be appreciated that the invention may find application outside the aviation industry and in any industry, such as in the packaging or delivery industry where a token or tag associated with an article or item of baggage is detected or read. Accordingly, the invention may find application in any industry where tags or tokens are used. Thus, embodiments of the invention find application in the travel industry in general, such as rail, coach, car, as well for delivery and courier services where tokens may be used.

Additionally, the following embodiments described may be implemented using a C++ programming language using for example an OpenCV library. However, this is exemplary and other programming languages known to the skilled person may be used such as JAVA.

Arch Structure

An embodiment of one aspect of the present invention will now be described with reference to FIG. 1.

Figure 1:
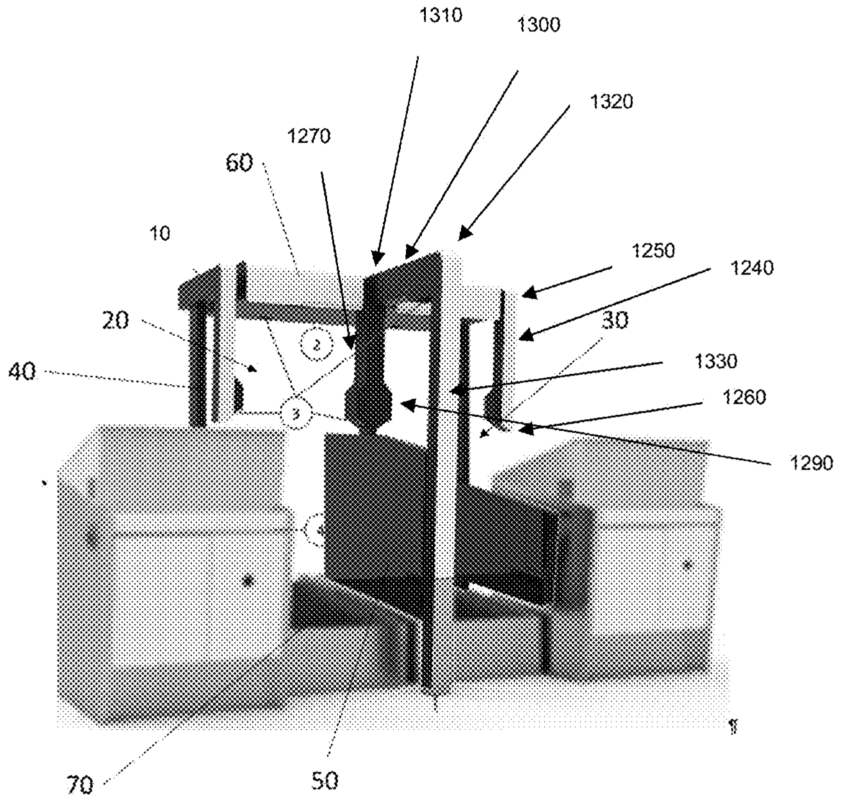
FIG. 1 is a diagram of a multi-lane article processing apparatus according to aspects of the present invention.

FIG. 1 illustrates a system 10 for processing items of luggage. In this example, the system forms part of a self-service bag drop at an airport. The system comprises a plurality of lanes. In this example, there is a first lane 20 and a second lane 30. Each lane comprises an arch structure. In this example, each arch comprises a first sidewall 40, a second sidewall 50 and a panel 60 linking the first sidewall and the second sidewall. The panel forms the top of the arch structure and comprises processing means. Furthermore, in this example, the first lane and the second lane are adjacent to one another such that they share a second sidewall. The arch structure of each lane projects from a base 70. In this example the base is a conveyor belt defining a surface on which items of luggage should be placed for processing. The height of the arch is such that the panel is at a distance from the base and the item to be processed. Ideally, the distance between the panel and the base is between 1 m and 2.5 m. This ensures the panel does not obstruct the item from being placed on the belt. The arch comprises features for the processing of an item of luggage. Each of these features is discussed in more detail below.

RFID Bag Tag Reading

An embodiment of one aspect of the present invention will now be described with reference to FIGS. 2 and 3.

Figure 2:
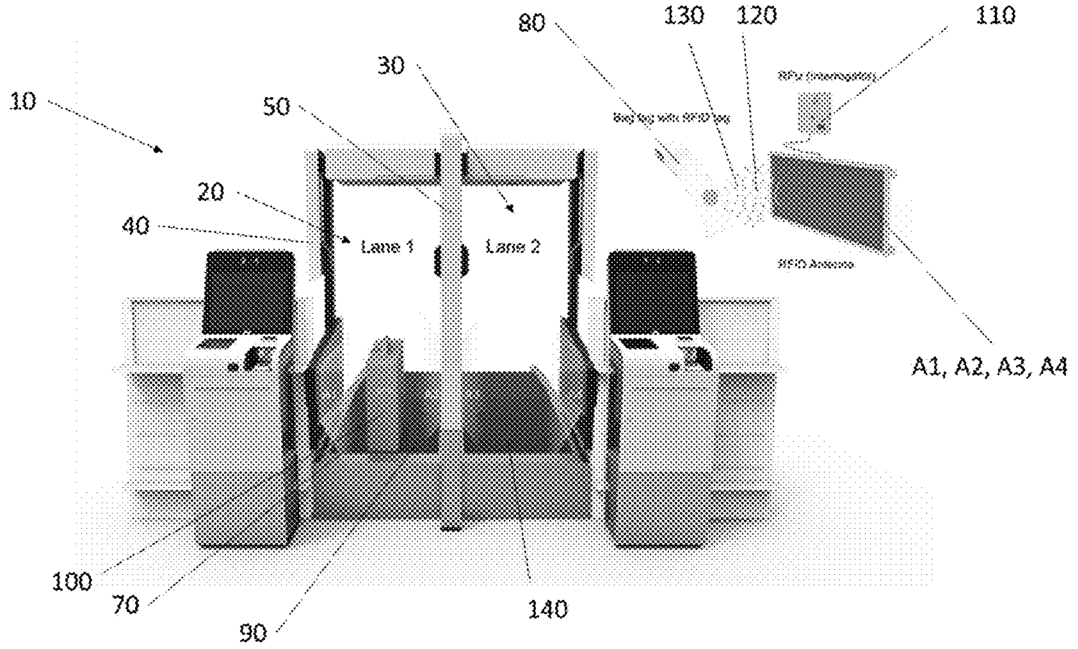
FIG. 2 is a diagram of a multi-lane article processing apparatus configured to read RFID tags according to aspects of the present invention.

FIG. 2 illustrates a system 10 for reading a radio-frequency identification (RFID) tag 80 according to aspects of the present invention. Each lane 20, 30 of the system comprises a plurality of antennas. In this example, each lane comprises a first antenna A1, A4 and a second antenna A3, A2. The first antenna and the second antenna are rectangular in cross section and are positioned at each lane in such a way that they oppose one another. In this way, the first antenna and the second antenna form side walls. The first antenna is disposed on the interior surface of the first sidewall 40 of the arch and the second antenna is disposed on the interior surface of the second sidewall 50 of the arch. The side wall structure of the antennas defines an area 90 between the first antenna and the second antenna in which an item to be processed 100 can be positioned. In this example, the item to be processed is an item of luggage. In each lane, the conveyor belt forms a base 70 extending between the first antenna and the second antenna on which items can be placed for processing. The area is, as a result, partially enclosed, in that the item of luggage is still visible during processing.

A RFID tag 80 is attached to the item of luggage 100 to be processed. The RFID tag stores information related to the item to be processed. In this example, the RFID tag also stores information related to the passenger travelling with said item of luggage. In order to retrieve the information stored in the RFID tag, the system further comprises an interrogator 110. The interrogator is coupled to each of the antennas A1, A2, A3, A4 in the system. The interrogator is configured to prompt each of the antennas to transmit a signal, referred to herein as a prompt signal 120. Said prompt signals are configured to prompt the RFID tag to transmit a signal in response. In other words, if the RFID tag is reached by a prompt signal, it sends out a signal of its own, referred to herein as a response signal 130. The response signal can subsequently be received by the relevant antenna, allowing the information stored in the RFID tag to be retrieved.

Referring back to the configuration of the first A1, A4 and second antennas A2, A3 associated with each lane 20, 30, having two opposing antennas surrounding the item of luggage 100 to be processed is significant. It is known that metal blocks and reflects RFID signals. Therefore, if an item of luggage to be processed contains a metal object between the RFID tag 80 and an antenna, the prompt signal from that antenna may not reach the tag, preventing the information held by the tag from being retrieved. Having an antenna on either side of the item of luggage to be processed is, therefore, advantageous. Such an antenna configuration results in the direction of travel of the prompt signals transmitted by the first antenna opposing the direction of travel of the prompt signals transmitted by the second antenna. This ensures there is an antenna whose prompt signal will not be shielded from powering the RFID tag by the metal object.

The system 10 comprises a number of features to ensure that it is able to correctly determine whether a bag tag 80 is attached to an item of luggage 100 in the first lane 20 of the system or the second lane 30 of the system. For example, the system comprises shielding between lanes. In this example, the system uses a layer of metal located between the first lane and the second lane, with metal being known to shield RFID signals. This prevents a prompt signal 120 from an antenna in the first lane from powering a bag tag in the second lane and vice versa. Furthermore, the system further comprises EMC or EMF absorbing paint. In this example, EMF or EMC absorbing paint is disposed at multiple locations of the system. Furthermore, in this example, the EMF or EMC absorbing paint is disposed between the first lane and the second lane. The EMF or EMC absorbing paint is configured to shield and absorb radio frequency signals. The paint absorbs signals from a bag tag or antenna that have been deflected by metal in the system. This further prevents the prompt signals from an antenna associated with one lane from powering a tag on a bag in the other lane. The EMC or EMF absorbing paint may, therefore, be disposed at any undesirable points of the system onto which signals are deflected.

The system 10 comprises further features to ensure that the antennas A1, A2 associated with a first lane 20 do not receive a response signal 130 from a bag tag 80 associated with a second lane 30, the system then erroneously determining that the tag and, therefore, the item 100 is associated with said second lane. For this purpose, the use of a single interrogator 110 for both lanes, as opposed to one for each lane, is significant. The interrogator prompts each of the plurality of antennas to transmit a prompt signal 120 in succession. In other words, only one antenna is enabled at a time, each for a number of milliseconds. The interrogator is configured to further introduce a small time interval between the prompt signal transmitted by each antenna. In this way, only one of the plurality of antennas transmits a prompt signal at a given time. The prompt signals transmitted by each antenna, therefore, do not interfere with one another. If, for example, an antenna of the first lane and an antenna of the second lane A3, A4 were to transmit prompt signals simultaneously, powering both a bag tag in the first lane and a bag tag in the second lane, both tags would transmit a response signal. The response signal from the bag tag in the first lane may, in such a situation, be picked up by the antenna of the second lane and vice versa. Such a situation is, in part, avoided by having only one antenna transmitting a prompt signal at any one time. Said prompt signal is prevented from powering a bag tag on the lane with which it is not associated due to the shielding between the first lane and the second lane discussed above. Furthermore, the inventors of the present invention found that using two interrogators (i.e. one for each lane) introduced phase differences between prompt signals. The result was either amplification of prompt signals, which would lead to reading RFID tags on the wrong lane, or reduction of prompt signals, which would lead to missing RFID tags.

The system is further configured such that bag tags 80 attached to items of luggage that are not on the conveyor belt 70 are not read. Specifically, the reading field of each antenna A1, A2, A3, A4 is configured such that it does not extend beyond a boundary 140. This boundary is defined as the front end of the conveyor belt of the lane with which the antenna in question is associated, the front end being the passenger-facing end of the belt. In this example, such a configuration is achieved using a software-based calibration tool. For each lane, an RFID tag is placed adjacent to the front end of its conveyor belt. The calibration tool is then used to reduce the strength of the prompt signal 120 of each antenna of said lane to just below the strength at which it powers the RFID tag. The result of this calibration process is that an RFID tag attached to an item of luggage 100 beyond the conveyor belts of the system will not be reached by a prompt signal such as to return a readable response signal 130. This avoids reading bag tags associated with items of luggage that are not yet meant to be processed. For example, by passengers who are queuing to use system.

Figure 3:
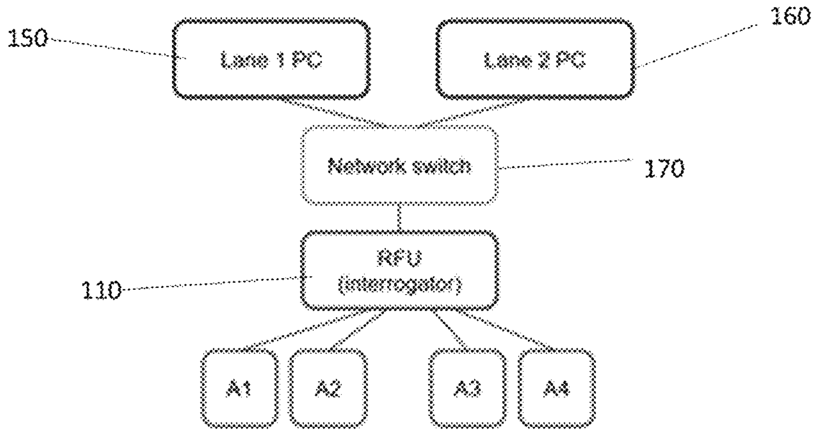
FIG. 3 is a schematic diagram outlining how the antennas of the apparatus shown in FIG. 2 are connected to other elements of the system according to aspects of the present invention.

FIG. 3 schematically illustrates the architecture that facilitates determining with which lane a bag tag attached to an item of luggage is associated. As explained above, the plurality of antennas of the system A1, A2, A3, A4 are coupled to a single interrogator 110. The interrogator is further coupled to a controller, the controller being configured to determine with which of the plurality of lanes the bag tag is associated. In this example, the controller is configured to determine whether the bag tag is attached to an item of luggage in the first lane of the system or the second lane of the system. In this example, the controller comprises a plurality of computing devices, each computing device being associated with one of the plurality of lanes. Specifically, a first computing device 150 is linked to the first lane and a second computing device 160 is linked to the second lane. In this example, the computing devices are located in the panel of the relevant arch structure. The interrogator is coupled to the first and second computing devices by way of a network switch 170 connected to the first computing device and the second computing device. In this way, upon an antenna picking up a response signal from a RFID tag, both computing devices receive telegram strings from the interrogator, said telegram strings comprising RFID tag information. The computing devices are then configured to identify by which antennas the RFID tag was read such that it can be determined with which lane the bag tag is associated. In other words, if the response signal was picked up by an antenna associated with the first lane (A1 or A2), the computing devices determine that the item of baggage with which the tag is associated is in the first lane. Corresponding logic applies to a response signal picked up by an antennas associated with the second lane (A3 or A4).

Referring back to FIG. 2, the system 10 can be modified such that it accounts for the fact that RFID antenna prompt signals 120 can extend to the back of an antenna A1, A2, A3, A4. This leads to the antenna A2 of the first lane 20 that is adjacent to the second lane 30 being susceptible to powering a bag tag 80 in the second lane, thus reading a response signal 130 from the wrong lane. Alternatively, the antenna A3 of the second lane that is adjacent to the first lane may power a bag tag in the first lane. To compensate for this, the system can be modified such that in the event one of said antennas picks up a response signal, it will only be determined that the bag tag is associated with the first lane if the other antenna associated with the first lane A1 also picks up a response signal. Specifically, it will only be determined that a bag tag is associated with lane 1 if either antennas A1 or a combination of A1 and A2 pick up a response signal. A reading by solely A2 would not suffice. By similar logic, it will only be determined that a bag tag is associated with lane 2 if either antennas A4 or a combination of A3 and A4 pick up a response signal. A reading by solely A3 would not suffice.

Determining the Conveyability and Dimensions of an Item of Luggage—V3

An embodiment of one aspect of the present invention will now be described with reference to FIGS. 4 to 27.

The system 10 comprises an image processing device. Said image processing device comprises processing means configured to ultimately determine whether an item of luggage placed on a conveyor belt of the system is able to be conveyed by the belt between an origin and destination, and then subsequently determine the dimensions of the item of luggage. An item of luggage is deemed to not be conveyable if it is of a substantially round shape. An item of luggage is further deemed to not be conveyable if it is of a substantially irregular shape. In this way, round items which may roll off the belt and irregular items which may damage the belt or get stuck on the belt are prevented from being conveyed. In this example, the origin of the path along which the item of luggage is to be conveyed is an airport bag drop and the destination is an area in which items of luggage are sorted for loading onto a mode of transport.

The image processing device comprises a camera for capturing an image of the belt. If an item of luggage is placed on the belt, it is captured by the camera. In this example, the camera is configured to capture an image in response to weight on the belt being detected (i.e. due to an item being placed on the belt). The weight is detected using a scale coupled to the belt. The camera is configured to capture data representing colours of the image, depth data associated with the image, and infrared data associated with the image. In this example, the camera is an Azure Kinect camera with RGB, depth and infrared outputs. The camera generates depth data using a time of flight sensor. Light is transmitted to the belt and subsequently received by the sensor once reflected by items on the belt and/or the belt itself. From the phase shift between the transmitted and received light, the Euclidean distance to the belt and/or the items on the belt is calculated using the known focal length and optical centre of the camera, providing depth data. The Euclidean distance, d, is calculated using the following equation: d=(x2+y2+z2)½, where x, y and z are respectively the distances in the x, y and z directions.

Figure 4:
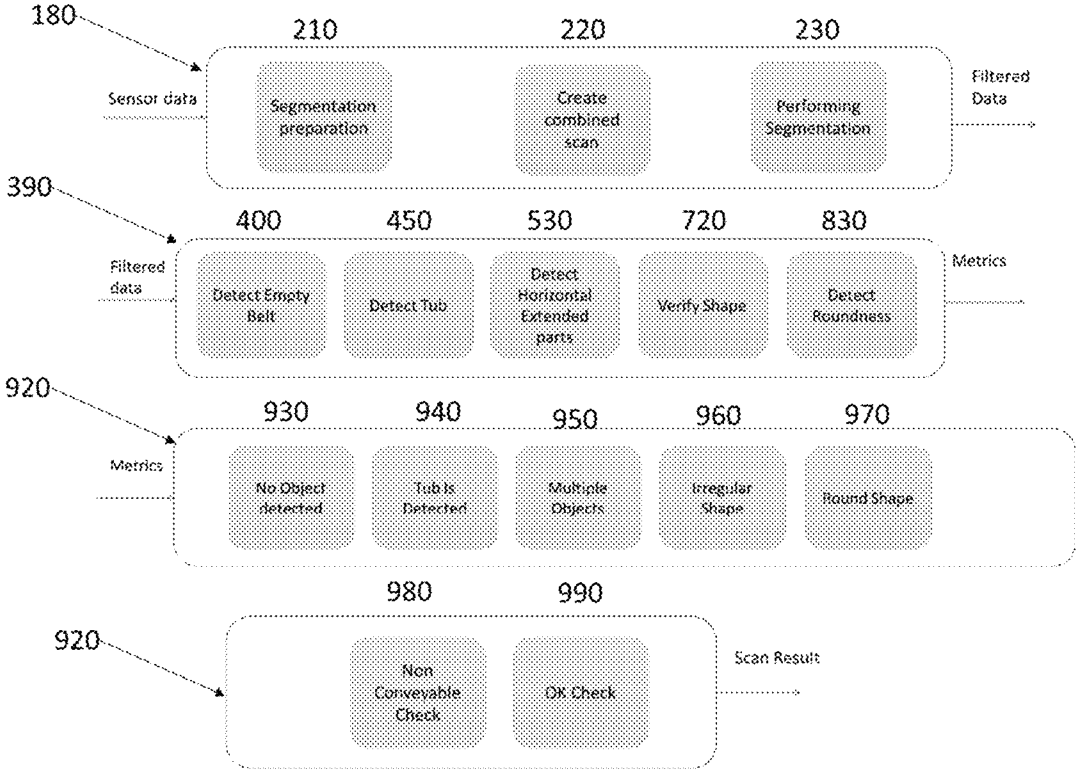
FIG. 4 is a flow chart outlining the steps performed by a processing means to determine whether an article is conveyable according to aspects of the present invention.
Figure 5:
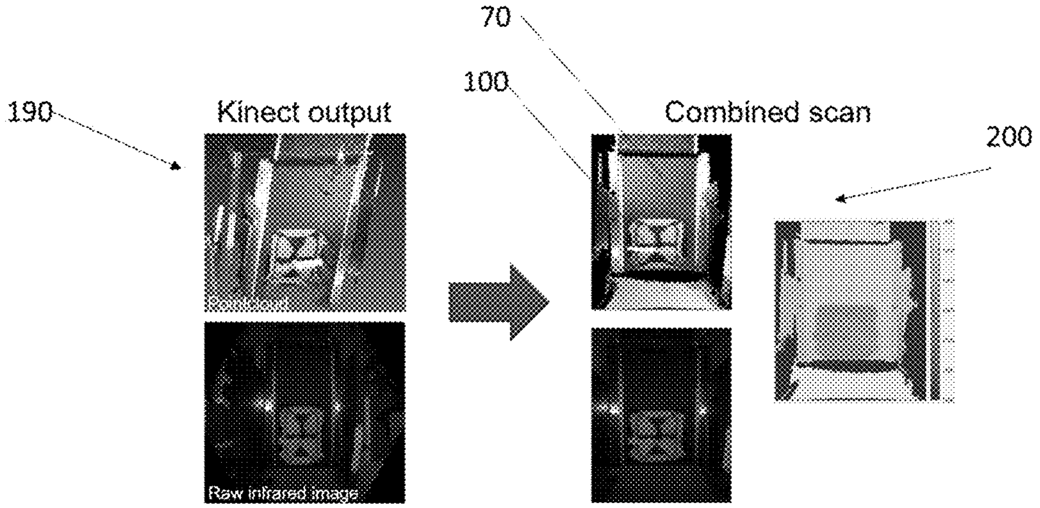
FIG. 5 shows how outputs of a camera are combined to generate a combined scan according to aspects of the present invention.

FIG. 4 is a flowchart outlining the steps performed by the processing means upon receiving data from the camera. The processing means of system 10 is first configured to receive RGB, depth and infrared data from the camera and filter said data as summarised in block 180. The processing means is configured to generate an RGB point-cloud infrared image from said data, 'point cloud' referencing a set of coordinates in three-dimensional space representing the captured area of the belt and any items of luggage disposed on said area. In this example, the point cloud information is generated by transforming the Euclidean distances associated with the depth data into a set of X, Y and Z coordinates. The processing means is then further configured to project the RGB point cloud infrared image onto an RGB and depth image. This generates a two dimensional image of the belt and any items on the belt, referred to herein as a combined scan. Such a two dimensional image facilitates the image processing techniques employed by the system, discussed substantially below. In this example, the RGB point cloud is projected using a known pin-hole model: x=f*(X/Z)+x0, y=f*(Y/Z)+y0, where f is the desired focal length for the projection and x0 and y0 are the desired centre coordinates of the image. The projected points are mapped to a grid (image). To avoid holes (i.e. where a pixel does not have a corresponding projected point), in this example, the used focal length is smaller than the actual focal length. For the mapping of points to a grid, linear interpolation is used to smooth the result. The infrared image is also corrected for lens distortion. For this remapping, the same desired focal length is used as with the projection of the point cloud. The images used to create the combined scan are also smoothed using a weighted average filter, the weighting being determined by the value of the alpha channel. They are further scaled, translated and cropped such that they correspond to only a region of interest on the belt. This region of interest is where an item of luggage is to be placed for processing. FIG. 5 shows an example camera output 190 and resulting combined scan 200 of an item of luggage 100 on a belt 70.

Figure 6:
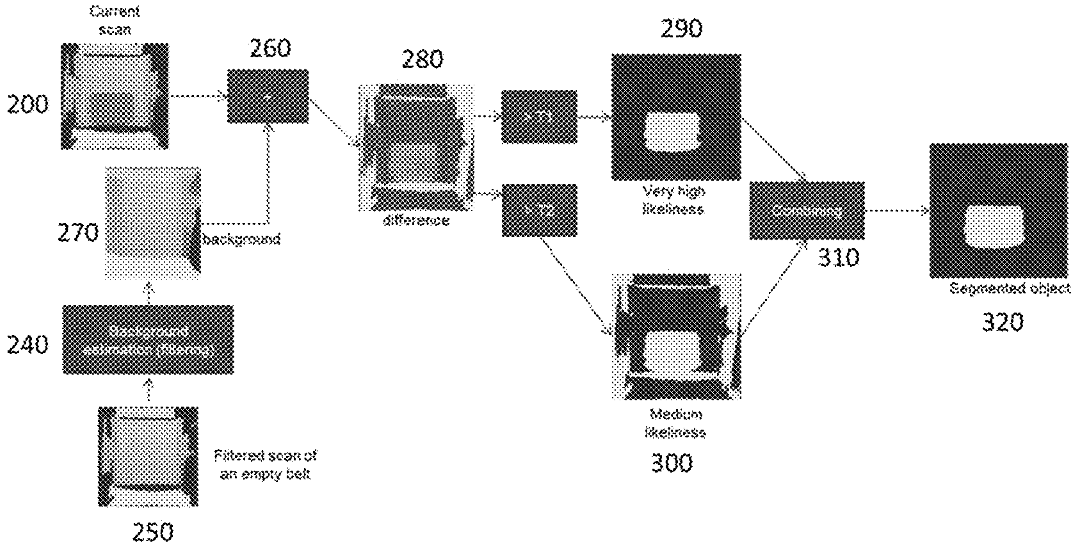
FIG. 6 is a flow chart outlining the steps performed by a processing means to segment an object from a combined scan according to aspects of the present invention.

Referring again to the flowchart of FIG. 4, before an item of luggage is placed on the belt, the system is configured to generate a scan of the belt when it is empty (i.e. no items on it) and the belt is extruded from the scan (step 210). This is ultimately used to segment the item of luggage from the belt in the combined scan. In this example, generating the scan of the belt when it is empty forms part of a calibration process. A single scan is generated, which is then used for all following scans and their associated segmentation process. Once an item of luggage has been placed on the belt, a combined scan is generated of the belt and the item (step 220). Using both the scan of the empty belt and the combined scan, the processing means is configured to segment a portion of the combined scan that represents the item on the belt (step 230). FIG. 6 is a flowchart outlining part of the segmentation process. At step 240, from a filtered scan of the empty belt 250, what constitutes background in the image is estimated. Then, at step 260, the estimated background 270 and combined scan 200 of an item on the belt are combined such as to generate a scan 280 that represents the difference between them. Then, thresholds are applied to the difference scan. In this example, a first threshold T1 and a second threshold T2 are applied. T1 is a stricter threshold, the result of which only retains pixels 290 that are highly likely to correspond to the item. T2, in contrast, retains pixels 300 that have a medium likeliness of corresponding to the item. Both resulting segmented images are combined (step 310). The result of this is taken to be the segmented object 320 on the belt from the combined scan.

Figure 7:
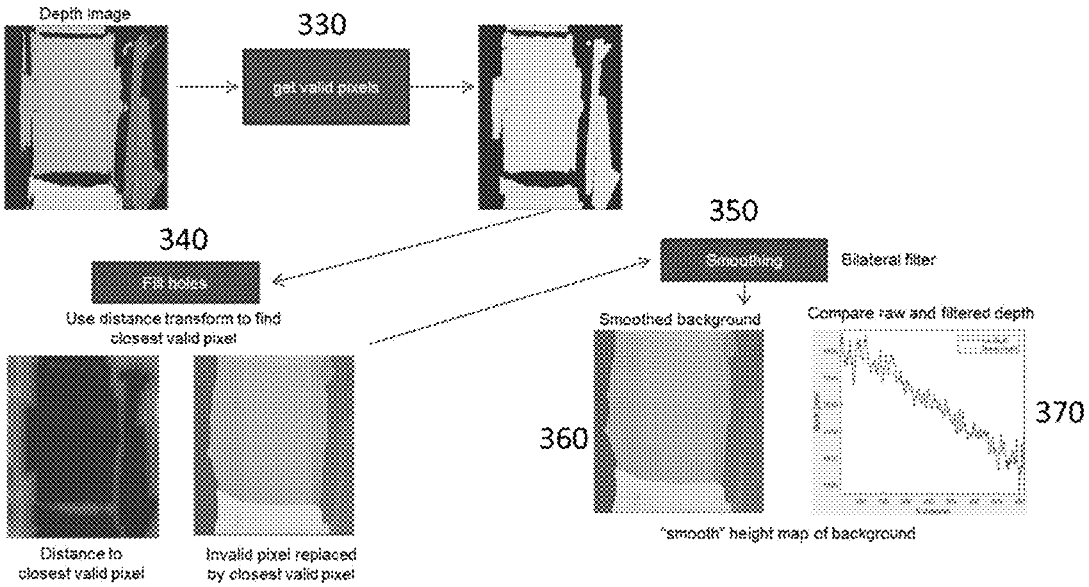
FIG. 7 is a flow chart outlining the steps performed by a processing means to estimate the background in a combined scan according to aspects of the present invention.

FIG. 7 is a flowchart detailing how, in this example, the background in the empty belt scan is estimated (FIG. 6, step 240). At step 330, valid pixels are segmented from the depth image. At step 340, the holes in the resulting image are filled. In this example, this is done using a distance transform to find the closest valid pixel for each invalid pixel, and replacing the invalid pixel with the closest valid pixel. At step 350, the resulting filled image is smoothed. In this example, this is done using a bilateral filter. The result is a smoothed height map of the background 360. The comparison between the raw depth and the filtered depth is shown in graph 370.

The processing means is further configured to detect the belt area during segmentation. This is because more sensitive segmentation is needed above the belt (where an item of luggage would be placed). Furthermore, by detecting the belt area it can be determined if the item is on, before, or after the belt. In this example, the belt is characterized as having low local variance in depth and low local variance in infrared intensity. Using this, the belt area is found by segmenting pixels with said low local variance in depth and infrared intensity. The connected components of the resulting segmentation are then calculated and the object in the centre of the image selected. Specifically, in this example, the segmentation thresholds for infrared intensity are 7 for the belt, and 20 for no belt. The thresholds for depth are 50 mm for the belt and 75 mm for no belt.

Figure 8:
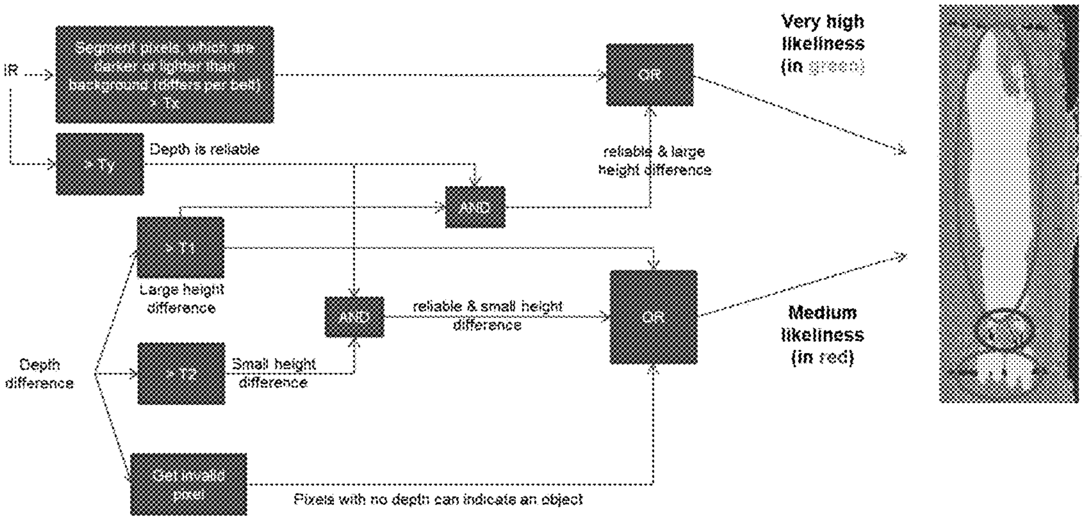
FIG. 8 is a flow chart outlining the steps performed by a processing means to segment an object from a combined scan according to aspects of the present invention.
Figure 9:
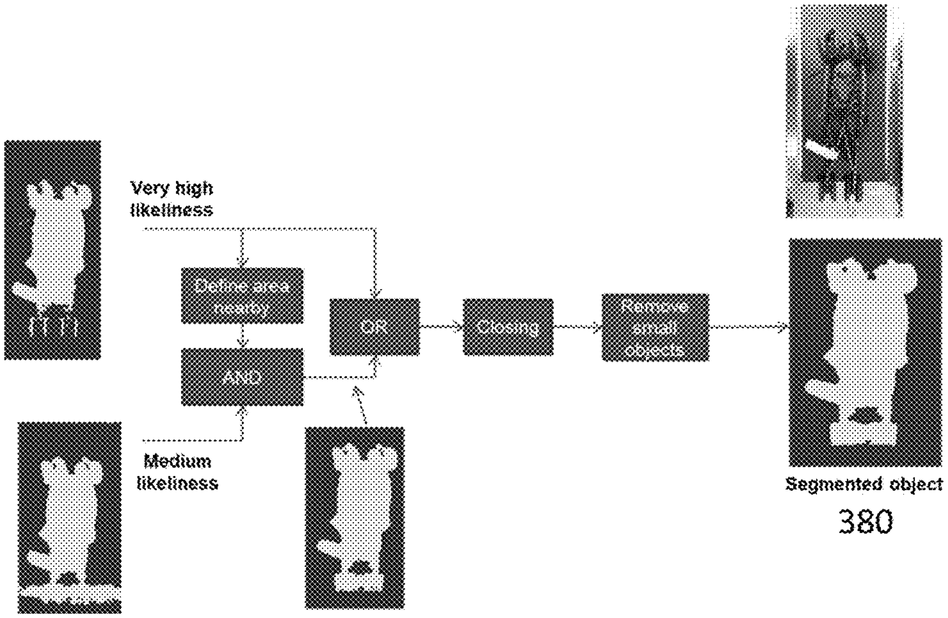
FIG. 9 is a flow chart outlining the steps performed by a processing means to segment an object from a combined scan according to aspects of the present invention.

FIG. 8 is a flowchart detailing how the two thresholds T1 and T2 are applied in FIG. 6, alongside infrared thresholds Tx and Ty. The value of Ty can be configured to deal with belts that do not have a flat surface. FIG. 9 is then a flowchart detailing how the high likeliness and medium likeliness images are combined at FIG. 6, step 310. The result of the segmentation and the actual item on the belt are shown at step 380.

Referring back to the flowchart of FIG. 4, the result of the processes outlined in block 180 is referred to herein as filtered data. In this example, this includes the segmented object and the combined scan. At block 390, the processing means is further configured to derive a plurality of metrics from the filtered data, each of which is discussed in more detail below.

Figure 10:
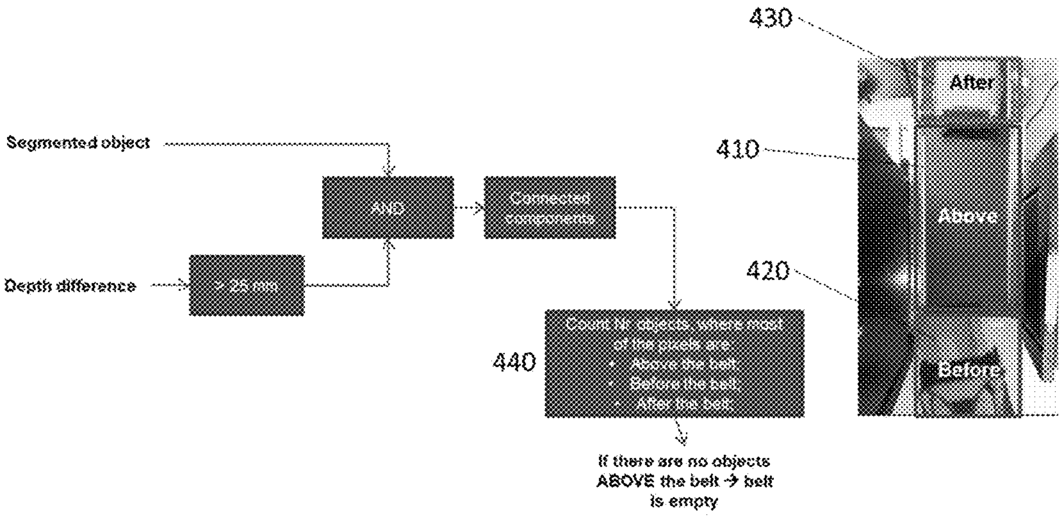
FIG. 10 is a flow chart outlining the steps performed by a processing means to determine where on a belt an object is according to aspects of the present invention.
Figure 11:
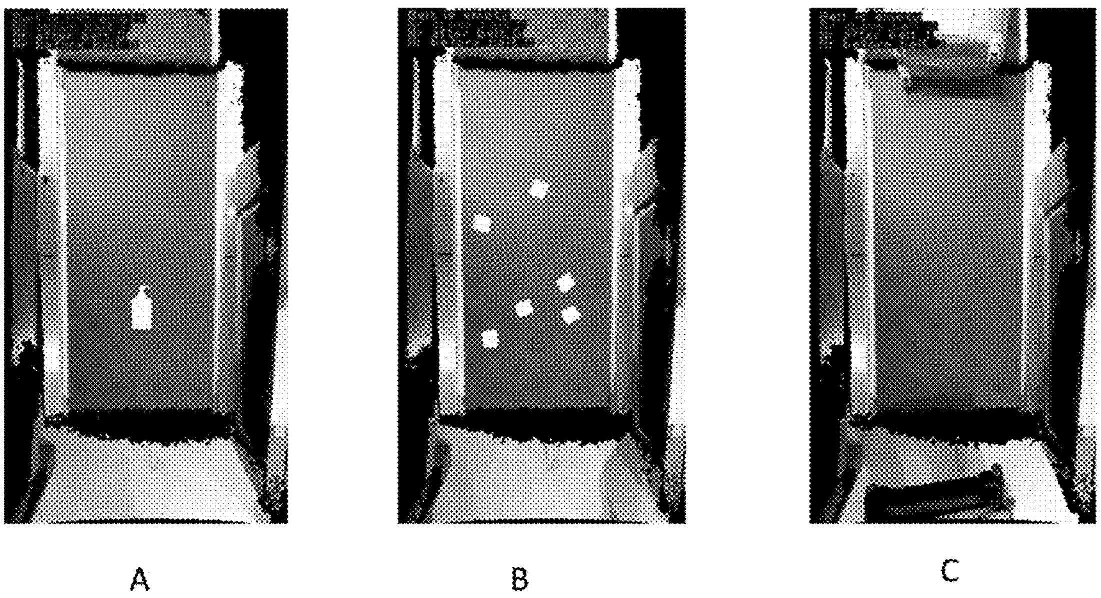
FIG. 11 shows a series of example scans in which it has been determined if the belt is empty or not according to aspects of the present invention.
Figure 12:
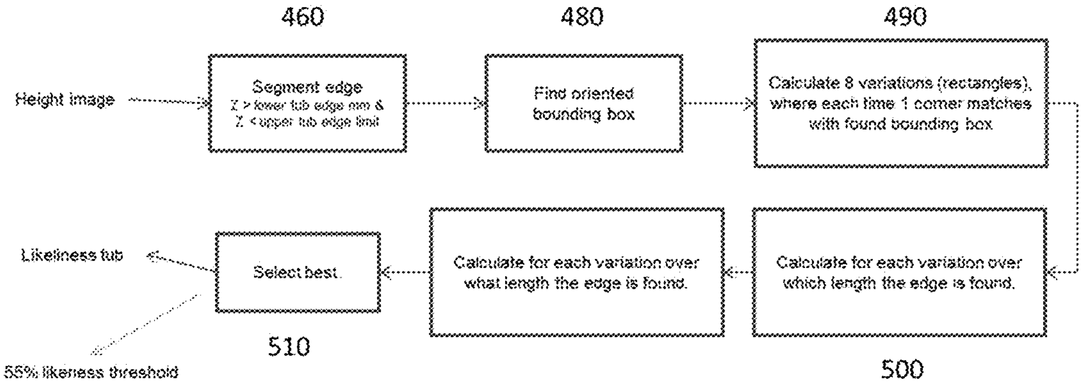
FIG. 12 is a flow chart outlining the steps performed by a processing means to determine if a tub is on the belt according to aspects of the present invention.

Firstly, the processing means is configured to determine whether the belt is empty (FIG. 4, step 400). This is done by counting the number of segmented objects in the image which have sufficient height such that they are likely to be items of luggage. The height of the object is determined by the difference in depth of the segmented object. Specifically, in this example, these are segmented objects with a height of over 25 mm. Once the objects are counted (taken to be the connected components resulting from identifying the segmented objects with a height over 25 mm), the processing means is configured to determine if these are objects after the belt, before the belt or above the belt. These regions are depicted in FIG. 10, which is a flowchart outlining this process. In this example, an object is categorised as being above the belt 410, before the belt 420 or after the belt 430 if the majority of pixels said object comprises are positioned in the relevant area (step 440). If no object is detected above the belt, it is determined that the belt is empty. This is set as a conclusion. FIGS. 11A to 11C show three example scans. In FIG. 11A, an object of sufficient height is detected above the belt. The belt is not concluded to be empty. In FIG. 11B, the objects are of insufficient height to reasonably be items of luggage. The belt is concluded to be empty. In FIG. 11C, no objects are detected above the belt, before the belt, or after the belt. The belt is concluded to be empty.

Once it has been determined whether or not the belt is empty, the processing means is further configured to determine whether a tub has been placed on the belt (FIG. 4, step 450), a tub being a container configured to hold an item of luggage for conveying said item along a path. Structurally, a tub comprises a base and at least one sidewall projecting from the base, the at least one sidewall extending around the perimeter of the base. In this way, an item of luggage that is placed on the base of the tub is prevented from moving beyond boundaries established by the sidewalls. A tub may have a rectangular base and may comprise four sidewalls, each sidewall extending along an edge of the rectangular base. Items of irregular shape or substantially round shape are considered conveyable when placed in a tub.

Figure 13:
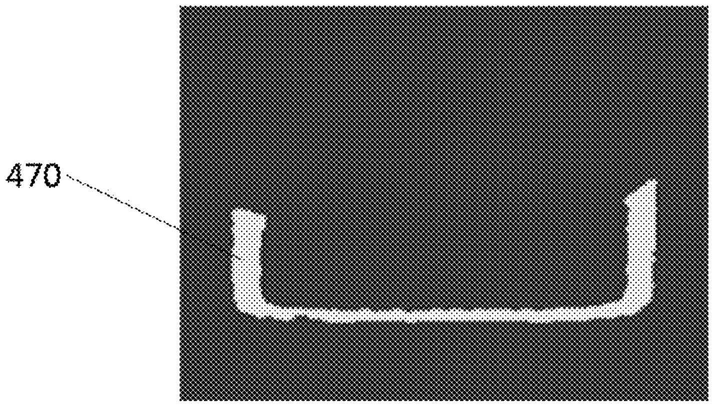
FIG. 13 shows an example segmented tub edge from a scan according to aspects of the present invention.
Figure 14:
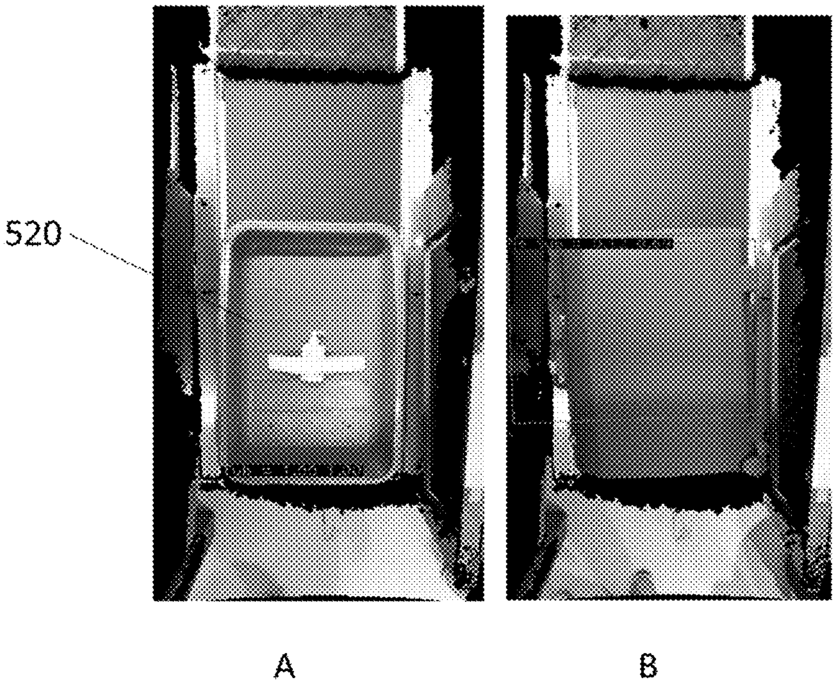
FIG. 14 shows a series of example scans in which it has been determined if there is a tub on the belt or not according to aspects of the present invention.

This is achieved by looking for a height profile corresponding to the edge of a known tub in the height data of the segmented scan. An example of this process is outlined in the flowchart of FIG. 12. First, the segmented object is further segmented such that only a portion having height data within an acceptable range is retained (step 460). FIG. 13 shows such a portion 470. Said range is within the bounds of that of known tub edges. Referring back to FIG. 12, a bounding box is then fit to the further segmented portion (step 480). Then, at step 490, 8 rectangles are fit to the bounding box, each having a corner matching with the found bounding box. At step 500, for each rectangle, over what length the edge is found is calculated, and the best match selected (step 510). It is then calculated how likely it is that said rectangle corresponds to the profile of a known tub. If the likeliness metric exceeds a threshold, a tub is concluded to have been detected. In this example, the threshold is 55%. FIGS. 14A and 14B show two example scans. In FIG. 14A, an edge that matches the profile of a known tub 520 is found. It is concluded that a tub is detected. In FIG. 14B, no edge that matches the profile of a known tub is found. It is concluded that no tub is detected.

Figure 15:
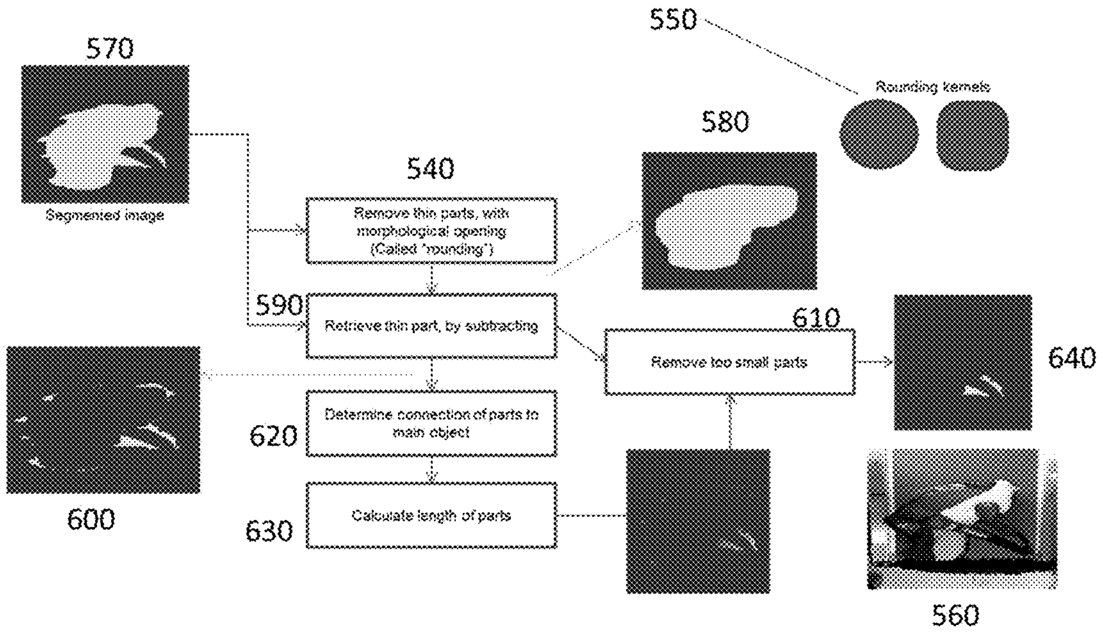
FIG. 15 is a flow chart outlining the steps performed by a processing means to find extended parts in a scan.
Figure 16:
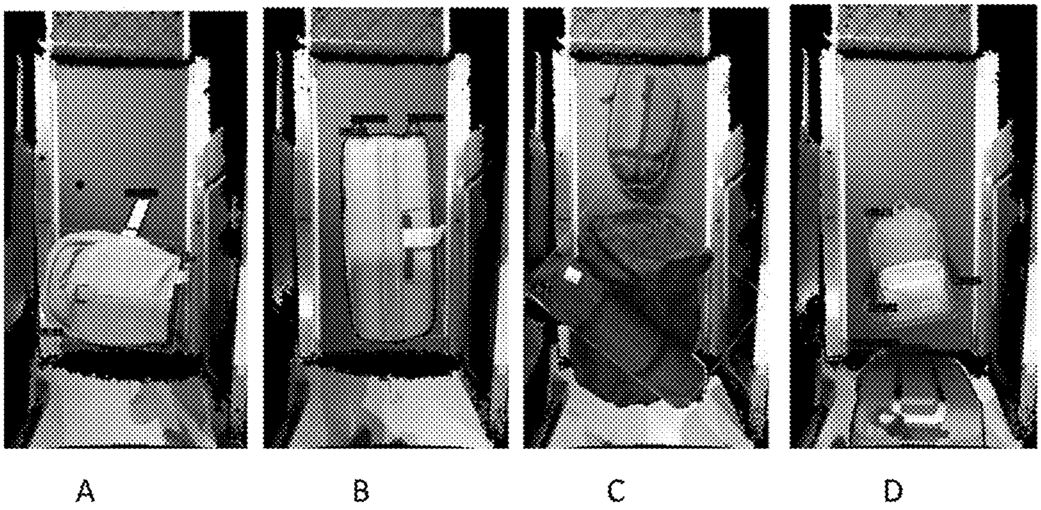
FIG. 16 shows a series of example scans in which extended parts have been detected and categorised according to aspects of the present invention.

Once it has been determined whether or not there is a tub on the belt, the processing means is further configured to detect what is referred to herein as extended parts of the scan silhouette (FIG. 4, step 530). That is extensions to the general profile of the segmented object. FIG. 15 is a flowchart outlining an example of how this is done. In this example, relatively thin parts of the segmented image are isolated (step 540). These are considered to potentially constitute extended parts. In this example, the thin parts are isolated by way of morphological opening (also known as rounding) the segmented object. The rounding kernels 550 are illustrated in FIG. 15. Element 560 shows a scan of an item on a belt. Element 570 shows the resulting segmented object and Element 580 shows the segmented object of Element 570 post rounding. By subtracting the rounded object image from the segmented object image (step 590), the thin parts are isolated. The result of this subtraction is shown in Element 600. Parts that are too small to be considered extended parts are removed (step 610), leaving only those which are likely to correspond to an extended part of the of the object on the belt. It is further determined if the remaining parts are connected to the main object (step 620). The length of each remaining part is then computed (step 630), with those that are not of sufficient length to correspond to an extended part of the imaged item on the belt being removed. The result of this process on the subtracted image of Element 600 is shown in Element 640.

Figure 17:
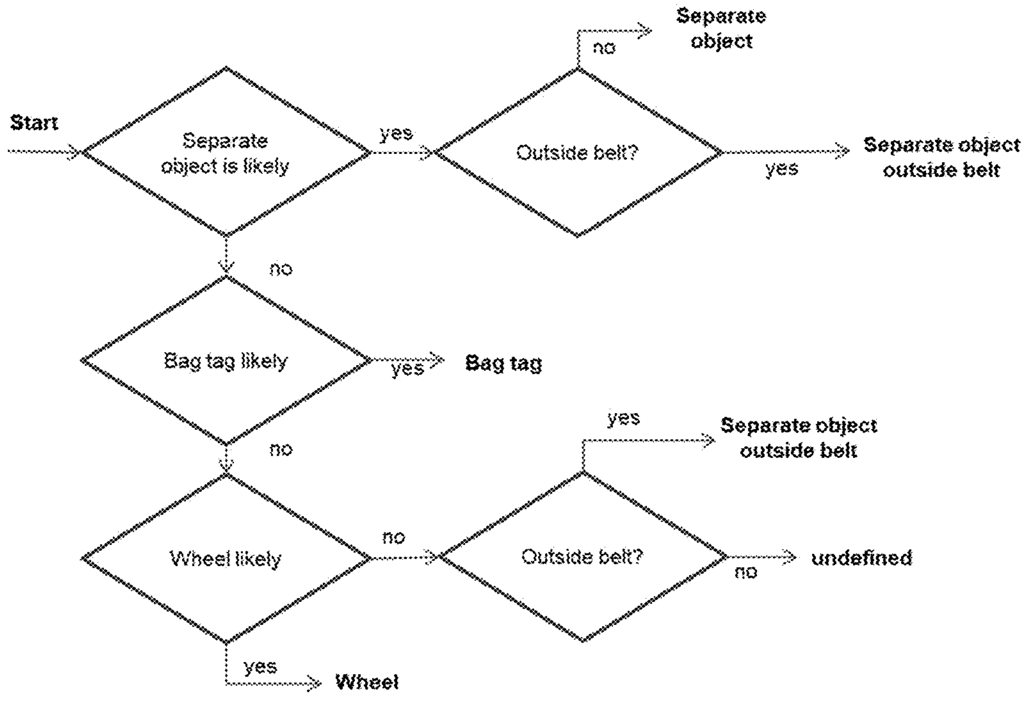
FIG. 17 shows a decision tree outlining how extended parts are classified according to aspects of the present invention.

Once the extended parts have been isolated, the processing means is further configured to categorise each of the extended parts. In this example, the categories are: bag tag, wheel, separate object and outside belt. An extended part is categorised as a bag tag if its corresponding RGB data suggests it is white (standard colour of known tags) and if its infrared intensity is within a range considered typical for an imaged bag tag. Specifically, this range is an infrared intensity of between 30 and 125. FIG. 16A shows an example scan which resulted in a conclusion of a bag tag being detected. An extended part is categorised as a wheel if the object is likely to correspond to a suitcase and the Z coordinates of the part are above a value expected for the wheel of known items of luggage (i.e. suitcases), and its dimensions correspond to those of known suitcase wheels. In this example, an object is deemed likely to be a suitcase if a fitted rectangle to its top surface corresponds to the profile of known suitcases and the extended parts have Z>100 mm to correspond to what is expected of a known wheel. FIG. 16B shows an example scan which resulted in a conclusion of wheels being detected. In this example, an extended part is categorised as a separate object if its distance from the main object is larger than 5 pixels, the height difference between the extended part and the main object is over 300 mm, the extended part is large compared to the width of its connection with the main object and it meets a minimum size threshold. FIG. 16C shows an example scan which resulted in a conclusion of a separate object being detected. An extended part is categorised as outside of the belt if its distance from the main object is larger than 15 pixels, the height difference between the extended part and the main object is over 300 mm and the majority of pixels are located before or after the belt (see FIG. 10). FIG. 16D shows an example scan which resulted in a conclusion of a separate object outside of the belt being detected. FIG. 17 is a decision tree summarising how the extended parts are classified.

Figure 18:
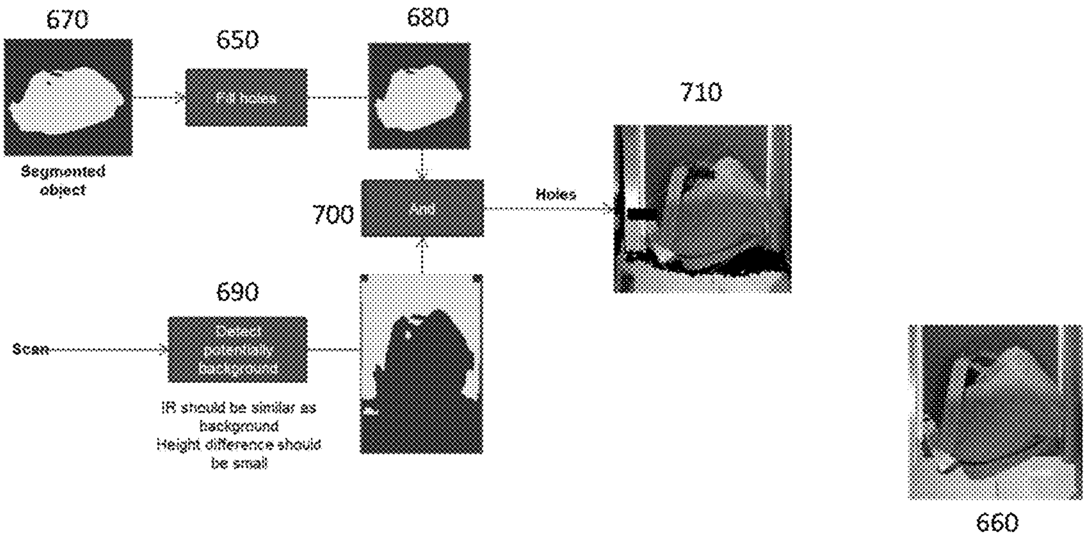
FIG. 18 is a flow diagram outlining the steps performed by a processing means to detect holes in a scanned object according to aspects of the present invention.

At this stage, the processing means is further configured to detect holes in the segmented object. FIG. 18 is a flowchart outlining an example of said process. Holes can be indicative of an item with straps, a backpack for example, or an item that is not conveyable. To detect holes, holes in the segmented object are filled (step 650). An example item of luggage on a belt is shown in Element 660. Element 670 then shows the resulting segmented object and Element 680 shows the segmented object with holes having been filled (referred to herein as a filled object). Using the combined scan, what is potentially background (i.e. not the segmented item) is detected (step 690). In this example, the background is identified by looking for regions in which the infrared intensity is similar and height difference is small. The image comprising the segmented object and the image comprising the filled object are then combined (step 700). The result is an image comprising just the holes. Element 710 shows the detected holes overlaid on the image of Element 660.

Figure 19:
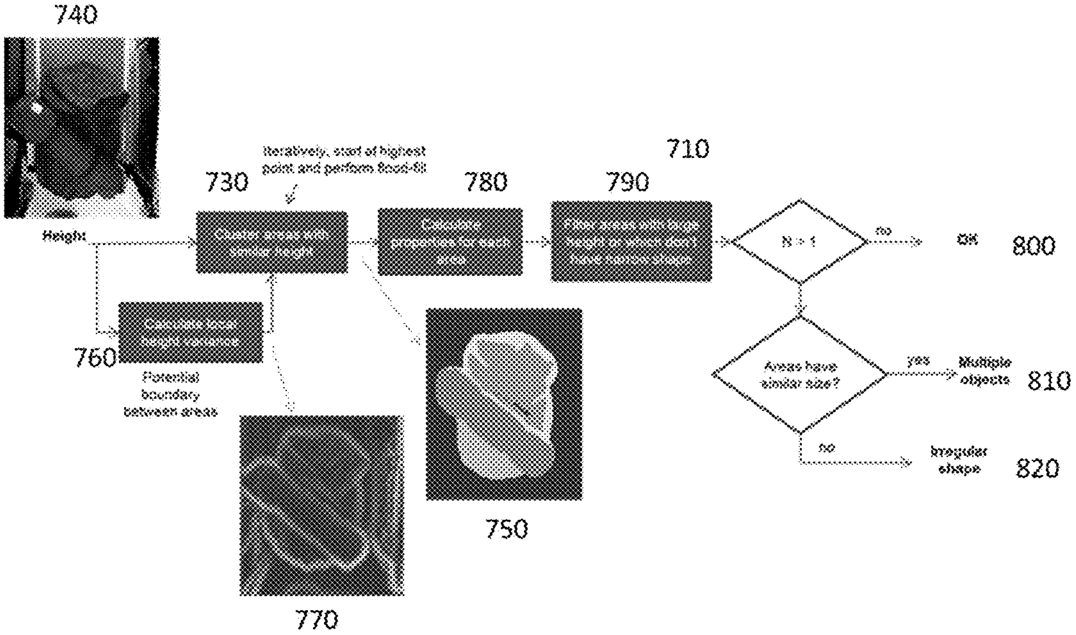
FIG. 19 is a flow diagram outlining the steps performed by a processing means to determine whether there are multiple items in a scan or items of irregular shape according to aspects of the present invention.
Figure 20:
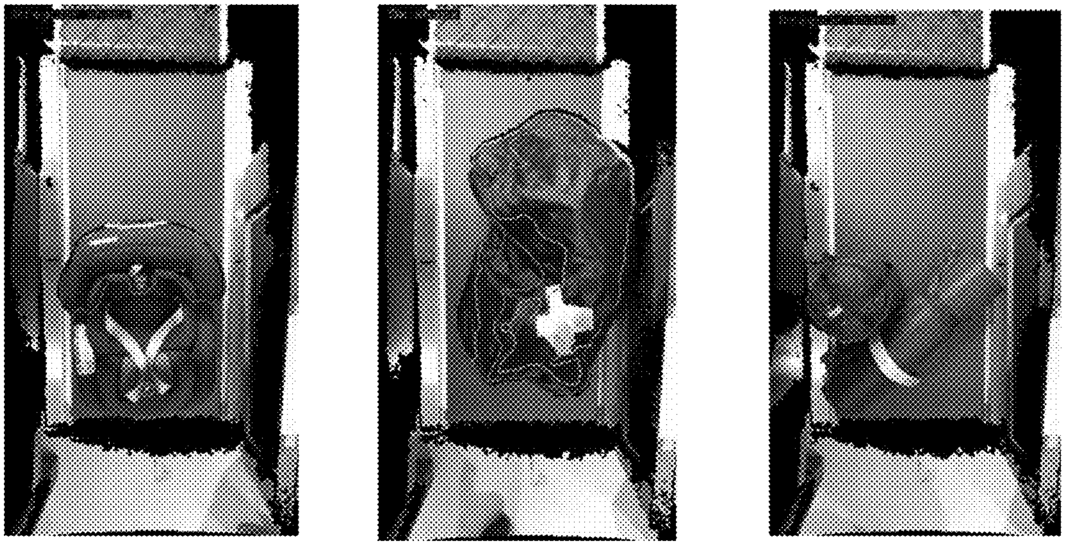
FIG. 20 shows a series of example scans in which it has been determined if the scanned item is of an irregular shape or if there are multiple items on the belt according to aspects of the present invention.

At FIG. 4, step 720, the processing means is configured to determine whether the scanned object is of an irregular shape or if multiple objects have been scanned. To do this, the height data is used. FIG. 19 is a flowchart outlining an example of such a process. Areas of similar height are clustered together (step 730). In this example, this is done iteratively by starting at the point of largest height and using known flood fill algorithms. Element 740 shows an example scan of two items on a belt and Element 750 shows the result of using the flood fill algorithms on the corresponding height data. At step 760, the local height variance in the data is calculated. This allows potential boundaries between different objects to be identified. Element 770 shows the boundaries identified in this way for the scan of Element 740. The processing means is then configured to calculate the properties of each identified separate area (step 780). Said areas which have a sufficiently large height or those which are not narrow in shape are then filtered from the image (step 790). These constitute areas which are likely to correspond to separate items on the belt or which are likely to be indicative of an item with an irregular shape. If only one area is filtered, it is concluded that there are not multiple objects (step 800). If more than one area is filtered and the areas are of comparable size, it is concluded that there are multiple objects (step 810). If more than one area is filtered and the areas are not of a comparable size, it is concluded that the object is of an irregular shape (step 820). In this way, the definition of what constitutes an irregular shape is defined by the algorithm itself. In this example, three areas of comparable size are filtered. It is, as a result, concluded that multiple objects are on the belt. An example of a scan which resulted in an irregular shape conclusion is shown in FIG. 20A. In this example, the item which is deemed to have an irregular shape is a car seat for infants. An example of a scan which resulted in neither a conclusion of irregular shape or multiple objects is shown in FIG. 20B. An example of a scan which resulted in a conclusion of an irregular shape due to two neighbouring items is shown in FIG. 20C.

Figure 21:
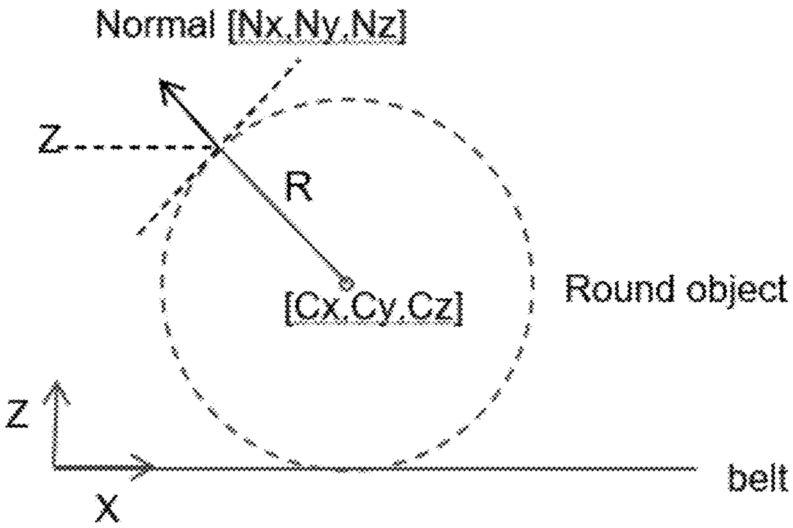
FIG. 21 is a schematic diagram of a round object on a belt according to aspects of the present invention.
Figure 22:
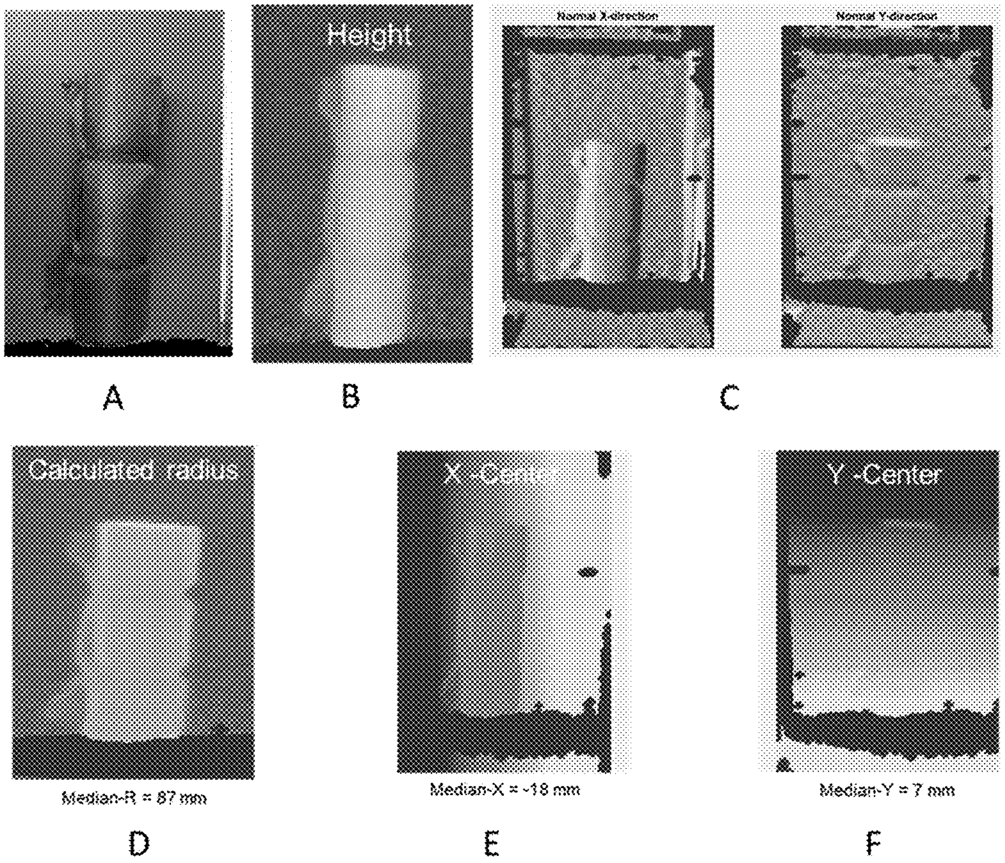
FIG. 22 shows the normals, radius and centre points for an example scan according to aspects of the present invention.

At FIG. 4, step 830, the processing means is configured to determine the roundness of the segmented object. This is achieved using the point cloud data. For each data point, the X, Y and Z coordinates are used to calculate the normal ([Nx,Ny,Nz]) of said point. Based on the normal, each pixel is assigned a possible centre point ([Cx,Cy,Cz]), and radius (R), under the assumption that the object is round. For illustration, an example data point is shown in FIG. 21 and its resulting normal, radius and centre point. In this example, the normals are calculated as follows:

$$dZdx = (Z[x+1, y] - Z[x-1, y])/2$$

$$dXdx = (X[x+1, y] - X[x-1, y])/2$$

$$dZdy = (Z[x, y+1] - Z[x, y-1])/2$$

$$dYdy = (Y[x, y+1] - Y[x, y-1])/2$$

$$N_1 = dZdx/dXdx \quad N_2 = dZdy/dYdy$$

$$Nz = 1/(sqrt(1 + N_1 * N_1 + N_2 * N_2))$$

$$Nx = N_1 * Nz$$

$$Ny = N_2 * Nz$$

For each point, the centre and radius are calculated as follows:

For each point of a round object on the belt:

$$X = Cx + R * Nx$$

$$Y = Cy + R * Ny$$

$$Z = Cz + R * Nz$$

For a round object on the belt:

$$Cz = R$$

$$Z = R + R * Nz$$

Calculate radius from Z (for every pixel):

$$R = Z/(1 + Nz)$$

Calculate centre (for every pixel):

$$Cx = X - R * Nx$$

$$Cy = Y - R * Ny.$$

FIG. 22A shows an item on a belt, FIG. 22B shows the resulting height/depth data for the item and FIG. 22C shows the resulting calculated normals in the x direction and y direction. FIG. 22D shows the median radius calculated for the item. In this example, the median radius is 87 mm. FIG. 22E shows the x-coordinate of the centre point (constant). In this example the median x-coordinate of the centre point is 18 mm. FIG. 22F then shows the median y-coordinate of the centre point. In this example the median y-coordinate is 7 mm.

Figure 23:
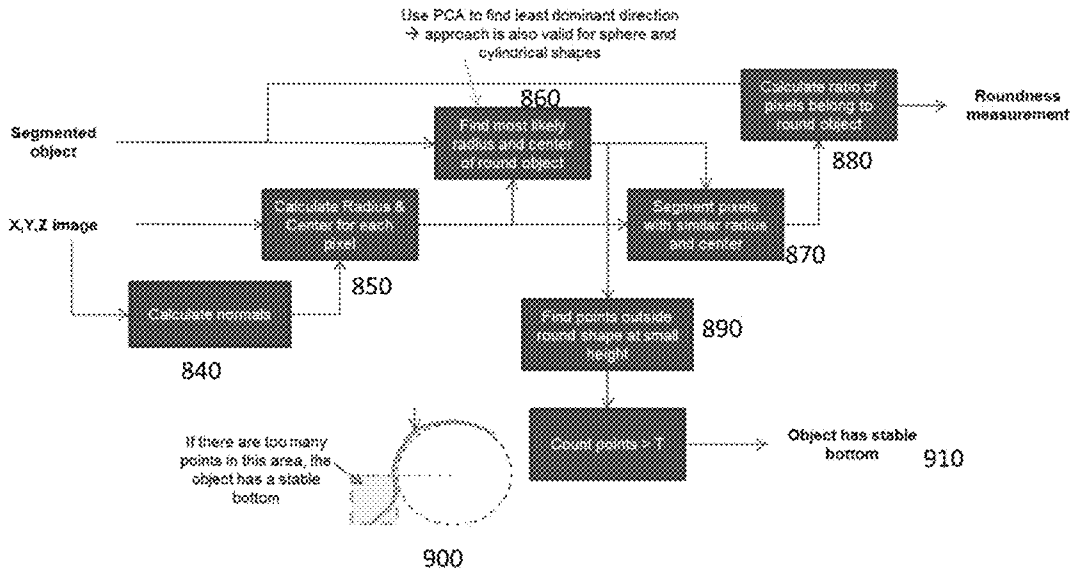
FIG. 23 is a flow chart outlining the steps performed by a processing means to determine if an item on the belt is round and if it has a stable bottom according to aspects of the present invention.
Figure 24:
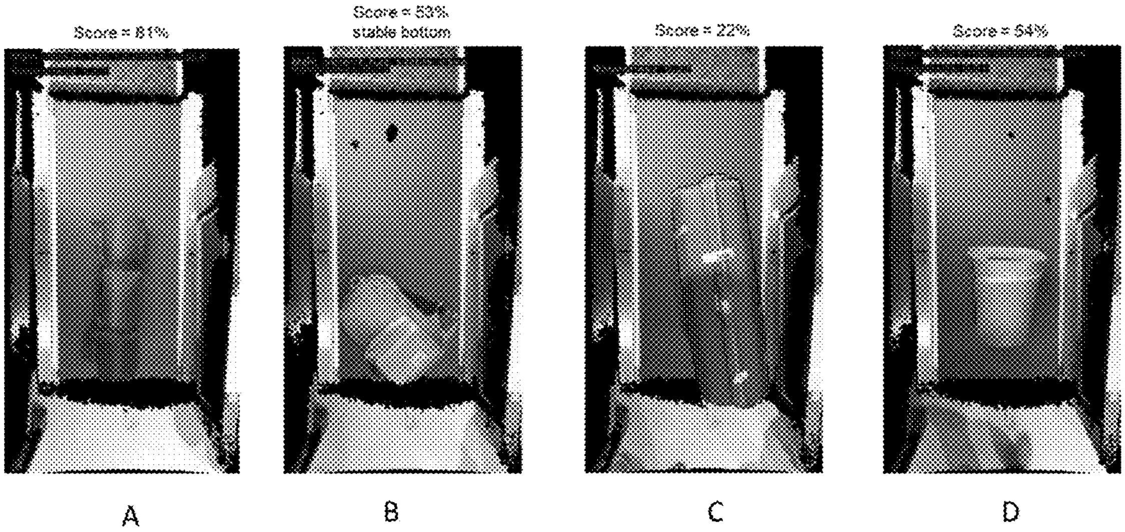
FIG. 24 shows a series of example scans in which a roundness metric has been determined and in which it has been determined if the item has a stable bottom according to aspects of the present invention.

FIG. 23 is a flowchart outlining an example process for determining whether an imaged item is round from the segmented object and the image comprising the X, Y, Z data. The normals, radii and centre points are calculated as outlined above from the X, Y, Z data (steps 840 and 850). From the segmented object, the most likely radius and centre point for the object, under the assumption it is round, is calculated (step 860). In this example, this is done using principal component analysis to find the least dominant direction. This approach is also valid for spherical and cylindrical shapes. At step 870, pixels sharing a similar radius and centre point are further segmented from the image, and the ratio of pixels belonging to the 'round' object is calculated (step 880). In this example, this is given as a percentage. This provides an indication of how round the object is. If the ratio is sufficiently high, it is concluded that the segmented object is of a round shape. The processing means is further configured to determine whether a round object has a stable base. For example, like a fortune teller's sphere. In this example, this is done by identifying points that exist at a small height away from the identified round shape (step 890). If a sufficient number of points are found to exist in said area (i.e. over a threshold T), an example of which is shown in Element 900, the object is marked as having a stable base (step 910). The round conclusion is, as a result, withdrawn. FIG. 24A shows a scanned item resulting in a roundness score of 81%. FIG. 24B shows a scanned item resulting in a roundness score of 53%, but that is further found to have a stable base. FIG. 24C shows a scanned item resulting in a roundness score of 22%. FIG. 24D shows an example scanned item resulting in a roundness score of 54%.

Referring again to the flowchart of FIG. 4, the above described processes of block 390 result in a plurality of metrics. Said metrics are then used to draw a number of conclusions about the scanned belt environment. These are outlined in block 920. At step 930, if no object was detected on the belt area at step 400, it is concluded that there is no object. If this is the conclusion, the further steps of 940 to 970 are not carried out and this is the result of the scan of the belt environment. At step 940, if a tub is detected at step 450, this is set as the overall conclusion. If this is the conclusion, the further steps 950 to 970 are not carried out and this is the result of the scan of the belt environment. At step 950, if multiple objects are detected due to extended parts being marked as separate objects or the height data suggesting multiple objects, it is concluded that there are multiple objects on the belt. If this is the conclusion, the further steps 960 to 970 are not carried out and this is the result of the scan of the belt environment. At step 960, if an irregular shape was detected due to extended parts, holes or the height data, it is concluded that the item on the belt is of an irregular shape. If this is the conclusion, the further step 970 are not carried out and this is the result of the scan of the belt environment. At step 970, if at step 830 it was determined that the object is round, this is set as the overall conclusion and this is the result of the scan of the belt environment. Ultimately, at step 980, if it concluded that the scanned item is of an irregular shape or is round, the item is considered non-conveyable. If at step 990 none of the previous steps of block 920 results in an overall conclusion, it is determined that the segmented object represents an item on the belt that is conveyable.

Figure 25:
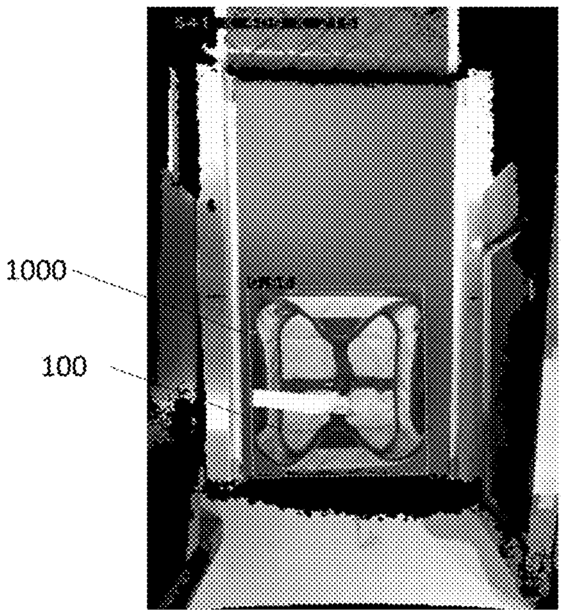
FIG. 25 shows an example scan in which a bounding box is used to determine the length and width of the scanned item according to aspects of the present invention.
Figure 26:
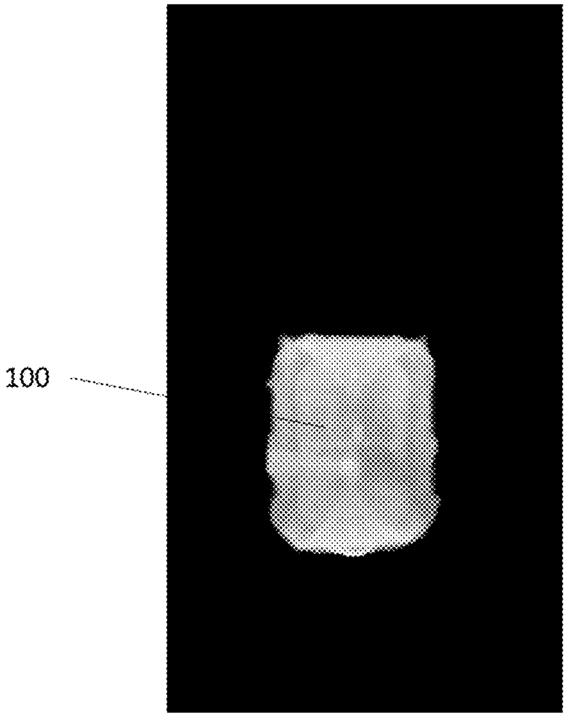
FIG. 26 shows an example scan in which a representation of the depth difference is used to determine the height of the scanned item according to aspects of the present invention.

If a scanned item is found to be conveyable, the processing means is further configured to determine the dimensions of the item. In this example, the length and width of the item are determined from the X, Y coordinates of a bounding box around the item. FIG. 25 shows an example bounding box 1000 around a bag 100 in a scan of the belt environment. To determine the height of the object, an image representing the depth difference between the segmented item on the belt and the belt is computed. Noise is then removed from the image. An example of such an image is shown in FIG. 26. The height of the bag 100 is then taken to be the maximum depth difference in the image.

Figures 27, 28:
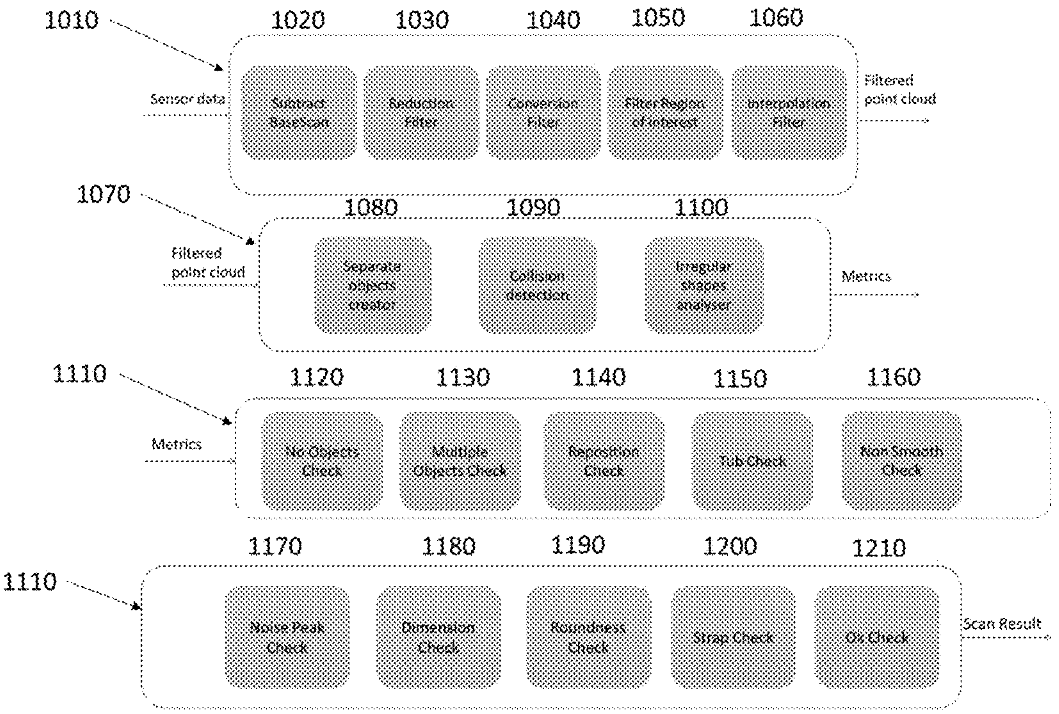
FIG. 27 is a set of tables outlining the success of the processing means in classifying scans of the belt environment according to aspects of the present invention.
FIG. 28 is a flow chart outlining the steps performed by a processing means to determine if an item on the belt is conveyable according to aspects of the present invention.

A set of tables summarising the accuracy of the algorithm summarised in FIG. 4 are shown in FIG. 27. Table A shows how many scans resulted in correct and incorrect conclusions by the algorithm (no object, conveyable (OK), multiple objects, non-conveyable, tub detected). Table B then summarises the total correct and incorrect conclusions in Table A.

Determining the Conveyability and Dimensions of an Item of Luggage—V2

An embodiment of one aspect of the present invention will now be described referring to FIGS. 28 to 29.

System 10 comprises a processing device configured to determine whether an item of luggage placed on the belt is conveyable by the system along a path between an origin and a destination. In this example, the origin is a self-service bag drop and the destination is an area in which luggage is sorted for loading onto a mode of transportation such as an aircraft. The processing device comprises processing means. Said processing means is configured to receive data from a camera. In this example, the camera is configured to generate point cloud data representing a portion of the belt of the system and any articles that are on the belt. That is a plurality of coordinates in three-dimensional space corresponding to said belt environment. In this example, the camera is an Intel RealSense D435 stereoscopic camera. In this example, the camera is configured to capture an image in response to a command by a common use self-service app. In other examples, the camera is configured to capture an image in response to weight on the belt being detected (i.e. due to an item being placed on the belt). The weight is detected using a scale coupled to the belt. The processing means is then configured to determine whether or not the item is conveyable, among other conclusions discussed in more detail below, using the point cloud data. In this example, the algorithm used by the processing means (see FIG. 28) is a PointCloud based algorithm. It is written in C#, and uses only Microsoft.NET libraries:

System.Numerics.Vectors, https://www.nuget.org/packages/System.Numerics.Vectors/. Other programming languages may be used, and may also use Microsoft NET libraries.

FIG. 28 is a flowchart outlining the steps performed by the processing means in response to receiving point-cloud data from the camera after an item of luggage has been placed on the belt. Before the process outlined in FIG. 28 commences, the system is first calibrated. During said calibration stage, the belt is imaged when it is empty. This generates point cloud data representing the empty belt environment. Furthermore, during this calibration stage, a region of interest on the belt is defined. This region of interest corresponds to where on the belt items of luggage are to be placed for processing. Once calibrated, the system is ready for an item of luggage to be placed on the belt for processing.

Referring now to FIG. 28, in a first step, the point cloud data received is filtered in a number of ways, summarised within block 1010. At step 1020 the point cloud data received is subtracted from the point cloud data representing the empty belt environment obtained during the calibration stage. At step 1030, a reduction filter is applied to the point cloud data. The filter reduces the density of the point cloud data. This increases the speed of processing performed by the system. At step 1040, the point cloud data is adjusted such that it is centred on the belt. This is done because the camera is configured to generate the point cloud data such that it is centred on the camera. In this example, this is done by converting the zero point of the z axis from the camera being z=0 to the belt being z=0. Furthermore, at step 1040, the point cloud is rotated such that the belt is level in the point cloud. In this example, the amount of rotation required is calculated during the calibration stage discussed above. At step 1050, all point cloud data outside of the region of interest is removed. This leaves just point cloud data representing the region of interest on the belt environment, where items are expected to be placed for processing. In this example, at step 1060, a filter is applied to reduce the effect of interpolation on the point cloud data, as the Intel RealSense D435 camera is configured to interpolate the point cloud. Resulting from the steps 1020 to 1060 within block 1010 is referred to herein as a filtered point cloud.

Referring still to the flowchart of FIG. 28, in a second step, the processing means is configured to derive a plurality of metrics from the filtered point cloud. These metrics are summarised within block 1070. At step 1080, the filtered point cloud is separated into clusters. This identifies separate objects in the point cloud data. In this example, a known k-nearest neighbour algorithm is used to determine which points in the filtered point cloud are close enough to one another to form a cluster. These clusters are then converted into separate objects in the point cloud. As the point cloud represents three-dimensional space, the surface area and dimensions of said objects can be determined by the processing means. At step 1090, it is determined which of the separate objects are sufficiently close such that they collide with one another. Those that do collide with one another are marked as belonging to the same group. In this example, whether separate objects collide is based on a convex hull around one of the objects. At step 1100, metrics that will subsequently be used to determine whether the imaged item on the belt is of an irregular shape are calculated, with the definition of irregular shape being defined by the algorithm itself as discussed below. In this example, said metric is the number of points in the filtered point cloud that are considered noise. Whether a point is noise is determined by, again, using a known k-nearest neighbour algorithm. If a point cannot be linked to a cluster, it is considered noise. In this example, the configuration values used for the k-nearest neighbour algorithm are stricter than those used to cluster the filtered point cloud at step 1070. Resulting from the steps 1080 to 1100 within block 1170 are metrics that are subsequently used to determine whether the imaged item is conveyable, among other conclusions.

Referring still to the flowchart of FIG. 28, in a third step, the processing means is configured to draw a number of conclusions about the imaged belt environment and the imaged item on the belt. These conclusions are summarised within block 1110. At step 1120, it is determined whether or not there are objects on the belt. In this example, if the clustered objects of step 1080 are not sufficiently large, it is determined that the there are no objects on the belt (i.e. the belt is empty). If this is the conclusion, the further steps of block 1110 are not carried out and this is the result of the scan of the belt environment. At step 1130, it is determined whether there are multiple objects on the belt. In this example, if a plurality of the clustered objects of step 1080 are sufficiently large and do not belong to the same group at step 1090, it is determined that there are multiple objects on the belt (for example, a first item of luggage and a second item of luggage). If this is the conclusion, the further steps of block 1110 are not carried out and this is the result of the scan of the belt environment. At step 1040, it is determined whether the entirety of the item of luggage placed on the belt is within the region of interest determined at the calibration stage. If the item is on the edge of the region of interest (i.e. too far in front of the region or too far behind the region), it is determined that the item needs to be repositioned. If this is the conclusion, the further steps of block 1110 are not carried out and this is the result of the scan of the belt environment. At step 1150, it is determined whether an item on the belt corresponds to a tub. In this example, a tub is identified from the filtered point cloud if the cloud comprises a profile that corresponds to that of the edge of a known tub. If so, it is determined that a tub is on the belt. If this is the conclusion, the further steps of block 1110 are not carried out and this is the result of the scan of the belt environment. At step 1160, it is determined whether the scanned item is smooth. In this example, this is determined by whether the ratio of noise points to total cloud points (see step 1100) exceeds a threshold. If the threshold is exceeded, it is determined that the scanned item is non-conveyable due to its irregular shape. If this is the conclusion, the further steps of block 1110 are not carried out and this is the result of the scan of the belt environment. At step 1070, from the filtered point cloud, it is determined how many height peaks there are in the cloud. If this amount exceeds a certain number, it is concluded that the scanned item is non conveyable due to its irregular shape. If this is the conclusion, the further steps of block 1110 are not carried out and this is the result of the scan of the belt environment. At step 1180, it is determined whether the grouped point clouds from step 1090 are of sufficient height and surface area to correspond to an item on the belt (i.e. whether dimensions of the scanned objects exceed a minimum threshold). If not, it is determined that there is no object on the belt. If this is the conclusion, the further steps of block 1110 are not carried out and this is the result of the scan of the belt environment. At step 1190, it is determined whether the shape of the filtered point cloud is of a spherical or cylindrical shape. If so, it is determined that the item on the belt is non-conveyable due to it having a spherical or cylindrical shape. If this is the conclusion, the further steps of block 1110 are not carried out and this is the result of the scan of the belt environment. At step 1200, it is determined if the item has straps. This is based on the amount of separate small objects within the group of the biggest objects. If it is determined that the item comprises straps, the scanned item is deemed non conveyable and the further steps of block 1110 are not carried out and this is the result of the scan of the belt environment. Finally, at step 1200, it is determined whether the scanned item is conveyable. In this example, if none of steps 1120 to 1200 draw a conclusion, the filtered point cloud is considered to correspond to a conveyable item on the belt. This is then the result of the scan of the belt environment. If found to be conveyable, the processing means is further configured to determine the dimensions of the item on the belt. In this example, this is by taking the dimensions of the largest of the separate objects on the belt from step 1080.

Figures 29, 30:
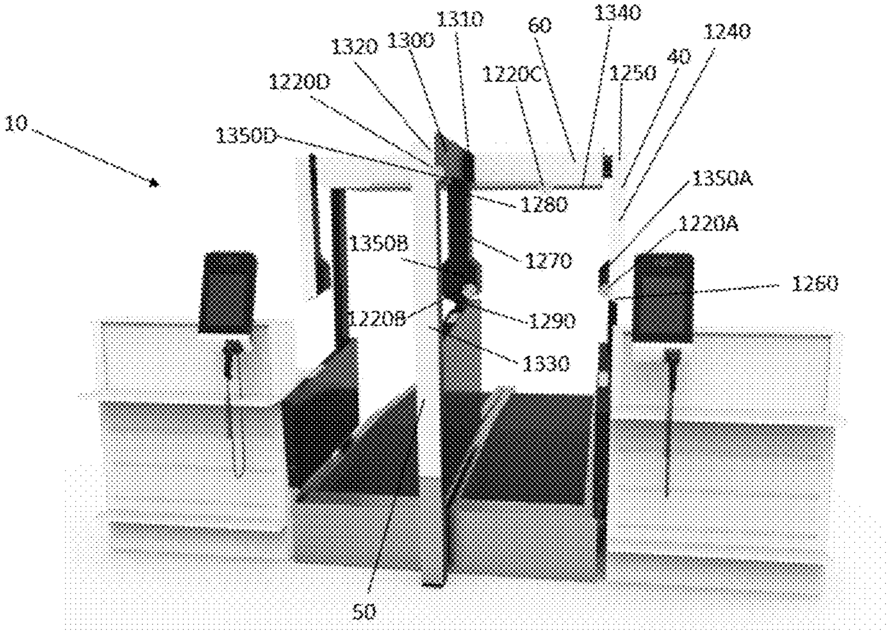
FIG. 29 is a set of tables outlining the success of the processing means in classifying scans of the belt environment according to aspects of the present invention.
FIG. 30 is a diagram indicating the location of cameras on the arch according to aspects of the present invention.

A set of tables outlining the accuracy of the algorithm summarised in FIG. 28 are shown in FIG. 29. Table A shows how many scans resulted in correct and incorrect conclusions by the algorithm (no object, conveyable (OK), multiple objects, non-conveyable, tub detected, repositioning required). Table B then summarises the total correct and incorrect conclusions in Table A.

Barcode Scanning

Figure 31:
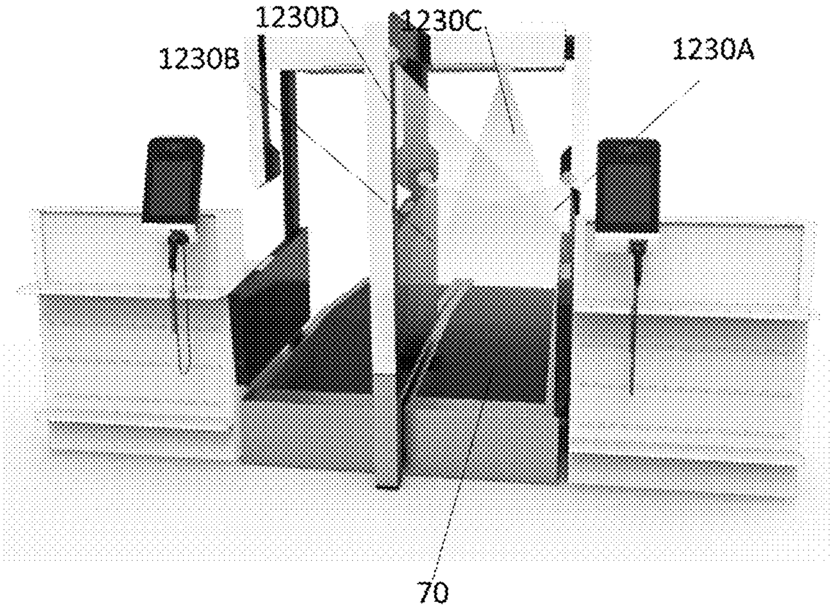
FIG. 31 is a diagram indicating the fields of view of cameras on the arch according to aspects of the present invention.

An embodiment of one aspect of the present invention will now be described with reference to FIGS. 30 to 31.

The system 10, as shown in FIG. 30, comprises a system configured to read a barcode on a bag tag attached to an item of luggage. In this example, the barcode is a visual barcode. To read the barcode, the system comprises a plurality of cameras 1220A-D. In this example, the cameras are Basler cameras. FIG. 30 shows where on an arch structure of the system the cameras are located. In this example, there are four cameras. FIG. 31 then illustrates the field of view of said cameras 1230A-D. Referring back to FIG. 30, a first of the plurality of cameras 1220A is located on the first sidewall 40 of the arch and a second of the plurality of cameras 1220B is located on a second sidewall 50 of the arch. A third of the plurality of cameras 1220C is located on the overhead panel 60 of the arch. Finally, a fourth of the plurality of cameras 1220D is also located on second sidewall, however it is positioned at a distance from the second of the plurality of cameras. In other words, the fourth of the plurality of cameras is offset from the second of the plurality of cameras. FIG. 31 shows the resulting fields of view of the first, second, third and fourth cameras. All fields of view are directed towards the belt 70, where an item of luggage is to be placed for processing. However, with the different positions of the cameras, the field of view of each camera is directed towards the belt from a different angle. This allows the system to look at the bag and, therefore, the associated bag tag from multiple angles, increasing the likelihood that a barcode will be read regardless of how the item of luggage is placed on the belt by the passenger, for example. In other words, the read rate is increased.

The system further comprises processing means configured to read said barcodes and retrieve information associated with the barcodes. In this example, the software used to extract barcode information from images of the barcodes is developed by Basler. Specifically, the software is Halcon (from MVTec).

The structure of the arch and the positioning of each of the plurality of cameras 1220A-D with reference to said structure is described in more detail below, with reference to FIGS. 1 and 30 of the drawings.

The first sidewall 40 comprises a first elongated portion 1240. The first elongated portion projects from the overhead panel 60 in a direction towards the belt 70. Said first elongated portion projects substantially perpendicularly from the overhead panel. The first elongated portion comprises a proximal end 1250 and a distal end 1260. Said proximal end is positioned adjacent to the overhead panel. Said distal end is the end opposing the proximal end. The first of the plurality of cameras 1220A is coupled to the first elongated portion. In this example, the first of the plurality of cameras 1220A is coupled adjacent to the distal end 1260 of the first elongated portion.

The second sidewall 50 comprises a second elongated portion 1270. The second elongated portion projects from the overhead panel 60 in a direction towards the belt 70. Said second elongated portion 1270 projects substantially perpendicularly from the overhead panel. The second elongated portion comprises a proximal end 1280 and a distal end 1290. Said proximal end is positioned adjacent to the overhead panel. Said distal end is the end opposing the proximal end. The second of the plurality of cameras 1220B is coupled adjacent to the distal end 1290 of the second elongated portion 1270.

The second sidewall 50 further comprises a third elongated portion 1300. Said third elongated portion projects substantially perpendicularly from the overhead panel 60. The third elongated portion further extends in a direction substantially perpendicular to the direction in which the second elongated portion 1270 projects. In this way, the third elongated portion extends in a direction which is substantially parallel to the belt 70. In this example, a length of the third elongated portion is comparable to a length of the overhead panel. The third elongated portion has a proximal end 1310 and a distal end 1320. The proximal end is defined as that which lies adjacent to the overhead panel. The distal end is that opposing the proximal end.

The second sidewall 50 further comprises a fourth elongated portion 1330. Said fourth elongated portion projects from the distal end 1320 of the third elongated portion 1300 towards the belt 70. In this example, the fourth elongated portion 1330 projects substantially perpendicularly to the third elongated portion 1300 such that a corner is formed between the third 1300 and fourth elongated portions 1330. The fourth of the plurality of cameras 1220D is coupled adjacent to said corner and, therefore, the distal end of the third elongated portion.

A fifth of the plurality of cameras 2 may also be located on the overhead panel 60 of the arch. Usually, the fifth of the plurality of cameras is a camera or scanner which sends data to a processor which is configured to determine a volume of an article or bag.

For example, the processor may be configured to check or determine from the data received from the fifth volume camera any one or more of whether:

- the bounding box dimension of the baggage; if it is in line with the agreed and predetermined dimensions;
- the number of articles. Multiple articles are rejected;
- the conveyability of the article, if a tub is required, or if different orientation of the bag is required;
- a tub is present.

The fifth of the plurality of cameras 2 is usually offset from the third of the plurality of cameras 1220C. In the specific embodiments of FIG. 1, the fifth of the plurality of camera is offset from the third of the plurality of cameras 1220C by a distance substantially equal to a distance of the overhead panel 60. The fifth and third of the plurality of cameras may be offset in a direction substantially parallel to the belt.

FIG. 1 shows a group of cameras, labelled as 3 in FIG. 1 which comprises the first 1220A, second 1220B, third 1220C and fourth 1220D of the plurality of cameras. Usually, the group of cameras 3 are cameras which are configured to scan barcodes. For example, one dimensional barcodes or 2 dimensional barcodes may be scanned, such as those which are usually printed on bag tags. An exemplary camera or scanner which may be used for this purpose is. In a specific example, a barcode scanning camera may be used that delivers 5 frames per second at 20 MP resolution. However, other barcode cameras will be known to the skilled person. The cameras may be configured to scan interleaved 2 out of 5 (ITF) barcodes.

In FIG. 1, an RFID sensor 4 may be embedded in each of the first sidewall 40 and the second sidewall 50.

As shown in FIG. 1, an intrusion sensor may also be provided towards one edge of the overhead panel 60. Usually, the intrusion sensor is an infrared intrusion sensor which is configured to detect objects which are larger than a predetermined size for example larger than 5×5×5 cm. The intrusion detector sends a signal to an article handling system comprising a processor which comprises instructions which sends a signal to a belt driving mechanism to stop the belt movement in response to intrusion detection.

The overhead panel 60 links the first sidewall 40 and the second sidewall 50. The third of the plurality of cameras 1220C is coupled to said overhead panel. In this example, the panel comprises a substantially cuboid shape. The substantially cuboid shape has a face 1340 opposing the belt 70. The third of the plurality of cameras is coupled to said face. Specifically, in this example, the third of the plurality of cameras is positioned substantially in the centre of said face of the panel.

The first elongated portion 1240 of the first sidewall and the second elongated portion 1270 of the second sidewall are of comparable length. Said length is less than a distance defined from the face 1340 of the panel 60 to the belt 70. In this example, said length is approximately half the distance from the face of the panel to the belt. The fourth elongated portion 1330 of the second sidewall, on the other hand, has a length comparable to the distance from the face of the panel to the surface. As a result of the structure of the first and second sidewalls, the first of the plurality of cameras 1220A and the second of the plurality of cameras 1220B are positioned in a same first plane. In this example, said first plane extends substantially parallel to the belt. The third of the plurality of cameras 1220C and fourth of the plurality of cameras 1220D are positioned in a same second plane. Said second plane extends substantially parallel to the belt in this example. As a result of the structure of the first and second sidewalls, a distance between the first plane and belt is smaller than a distance between the second plane and the belt.

In this example, each of the first, second and fourth of the plurality of cameras 1220A,B,D is coupled to a protruding portion 1350A,B,D of the first and second sidewalls 40, 50. Each of the protruding portions has a substantially trapezoid shape, the trapezoid shape comprising at least one surface that diagonally projects from the sidewall to which it forms part of. In this example, each of the first, second and fourth of the plurality of cameras is coupled to such a surface such that their field of view is directed towards the belt 70. In this example, the first of the plurality of cameras is coupled to a first protruding portion 1350A at the distal end 1260 of the first elongated portion 1240. The second of the plurality of cameras is coupled to a second protruding portion 1350B at the distal end 1290 of the second elongated portion 1270. The fourth of the plurality of cameras is coupled to a third protruding portion 1350D at the distal end 1320 of the third elongated portion 1300. Alternative configurations are, however, possible.

General

The device may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

According to specific embodiments, the V3 algorithm, described on pages 15 to 24 may use OpenCV to execute one or more of the processing steps previously described. Of course, embodiments of the invention may use other libraries, and so the skilled person will appreciate that the scope of the claims should not be limited to OpenCV.

OpenCV (Open Computer Vision) is a C++ library, that converts images into Matrix objects, on which mutations and analysis can be applied. Embodiments may use the CSharp wrapper around this Library: OpenCvSharp4 version: 4.6.0.20220608.

Specific embodiments may use the following functions:

Operations on arrays:
https://docs.opencv.org/4.6.0/d2/de8/group_core_array.html#gacc40fa15eac0fb83f8ca70b7cc0b588d
Mean
Sqrt
Multiply
BitwiseAnd
BitwiseOr
BitwiseNot
Merge
MinMaxLoc
CountNonZero
Absdiff Geometric Image Transformations:
https://docs.opencv.org/4.6.0/da/d54/group_imgproc_transform.html#ga0203d9ee5fcd28d40dbc4a1ea4451983
WarpAffine Camera Calibration and 3D Reconstruction:
https://docs.opencv.org/4.6.0/d9/doc/group_calib3d.html#ga69f2545a8b62a6b0fc2ee060dc30559d
Undistort
ReprojectImageTo3D
ProjectPoints Image Filtering:
https://docs.opencv.org/4.6.0/d4/d86/group_imgproc_filter.html#gaeb1e0c1033e3f6b891a25d0511362aeb
MorphologyEx-Erode, Dilate, Open, Close
BilateralFilter
Filter2D
GetStructuringElement Drawing Functions:
https://docs.opencv.org/4.6.0/d6/d6e/group_imgproc_draw.html
FillPoly
DrawContours Miscellaneous Image Transformations:
https://docs.opencv.org/4.6.0/d7/d1b/group_imgproc_misc.html
FloodFill
Threshold
Distance Transform Structural Analysis and Shape Descriptors:
https://docs.opencv.org/4.6.0/d3/dc0/group_imgproc_shape.html#ga2c759ed9f497d4a618048a2f56dc97f1
Bounding Rect
MinAreaRect
ContourArea
ConvexHull
FindContours
ConnectedComponentsWithStats HistoGrams:

https://docs.opencv.org/4.6.0/d6/dc7/group_imgproc_hist.html#ga4b2b5fd75503ff9e6844cc4dcdaed35d CalcHist Morphology operations from the OpenCV documentation may be used:

https://docs.opencv.org/4.x/d9/d61/tutorial_py_morphological_ops.html

Accordingly, it will be appreciated that in specific embodiments, the detection algorithm uses combinations of these functions, to perform the desired analysis.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media.

The invention claimed is:

1. A system for reading a tag comprising a barcode, the tag being attached to an item to be processed, the system comprising:

an arch projecting from a surface (70), the arch comprising a first sidewall (40), a second sidewall (50), and a panel (60) linking the first sidewall and the second sidewall, wherein the first sidewall (40) comprises a first elongated portion projecting from the panel (60) towards the surface (70) and wherein the second sidewall (50) comprises a second elongated portion projecting towards the surface (70), a length of the first elongated portion and a length of the second elongated portion being less than a distance defined from a face of the panel to the surface;

a plurality of cameras (1220A-D) each having a field of view directed towards the surface (70) from differing angles, wherein a first of the plurality of cameras (1220A) is located on the first sidewall (40) and coupled to the first elongated portion and a second of the plurality of cameras (1220B) is located on the second sidewall (50) and coupled to the second elongated portion; and processing means configured to read the barcode using the plurality of cameras, the item to be processed being disposed on the surface to which each of the plurality of cameras directs their field of view.

2. The system of claim 1 wherein a fourth of the plurality of cameras (1220D) is located on the second sidewall (50) offset from the second of the plurality of cameras (1220B).

3. The system of claim 2 wherein the first of the plurality of cameras (1220A) and the second of the plurality of cameras (1220B) are positioned in a same first plane and preferably wherein the first plane is substantially parallel to a belt.

4. The system of claim 3 wherein the third of the plurality of cameras (1220C) and the fourth of the plurality of cameras (1220D) are positioned in a same second plane and preferably wherein the second plane is substantially parallel to the belt and preferably wherein the first plane is offset from the second plane in a direction substantially perpendicular to the belt.

5. The system of claim 4 wherein a distance between the first plane and the surface (70) is smaller than a distance between the second plane and the surface.

6. The system of claim 1 wherein the second sidewall (50) comprises a second elongated portion (1270) projecting from the panel (60) towards the surface (70), the second of the plurality of cameras (1220B) being coupled to the second elongated portion.

7. The system of claim 6 wherein the second of the plurality of cameras (1220B) is coupled adjacent to a distal end (1290) of the second elongated portion (1270).

8. The system of claim 6 wherein the second sidewall (50) comprises a third elongated portion (1300) projecting substantially perpendicularly from the panel (60).

9. The system of claim 8 wherein the second sidewall (50) comprises a fourth elongated portion (1330) projecting from a distal end (1320) of the third elongated portion (1300) towards the surface (70), the fourth of the plurality of cameras (1220D) being coupled adjacent to said distal end of the third elongated portion (1300).

10. The system of claim 9 wherein a length of the fourth elongated portion (1330) is comparable to a distance defined from a face of the panel (60) to the surface (70).

11. The system of claim 8 wherein a length of the third elongated portion (1300) is comparable to a length of the panel (60).

12. The system of claim 1 wherein the first of the plurality of cameras (1220A) is coupled adjacent to a distal end (1260) of the first elongated portion (1240).

13. The system of claim 1 wherein a length of the first elongated portion (1240) and a length of the second elongated portion (1270) is less than a distance defined from the face of the panel (60) to the surface (70).

14. The system of claim 1 wherein the first, second and fourth of the plurality of cameras (1220A,B,D) are each coupled to a surface which diagonally projects from the arch such that their field of view is directed towards the surface (70).

15. The system of claim 1, wherein the first sidewall (40) projects substantially perpendicular from the panel (60).

16. A method for reading a tag comprising a barcode, the tag being attached to an item to be processed, the method comprising:

reading the barcode using a plurality of cameras (1220A-D) each of the plurality of cameras having a field of view directed towards a same surface (70) from differing angles wherein the item to be processed is disposed on the surface to which each of the plurality of cameras directs their field of view, and wherein a first of the plurality of cameras (1220A) is located on a first sidewall (40) of an arch projecting from the surface (70) and a second of the plurality of cameras (1220B) is located on a second sidewall (50) of the arch, the arch comprising the first sidewall (40), the second sidewall (50), and a panel (60) linking the first sidewall (40) and the second sidewall (50), wherein the first sidewall comprises a first elongated portion projecting from the panel towards the surface and the first of the plurality of cameras is coupled to the first elongated portion and the second sidewall comprises a second elongated portion projecting towards the surface, a length of the first elongated portion and a length of the second elongated portion being less than a distance defined from a face of the panel to the surface and the second of the plurality of cameras is coupled to the second elongated portion, a third of the plurality of cameras being coupled to the face of the panel opposing the surface.

17. A computer program product storing a program which, when executed by a computing device, causes the computing device to read a barcode using a plurality of cameras (1220A-D), each of the plurality of cameras having a field of view directed towards a same surface (70) from differing angles wherein an item to be processed is disposed on the surface to which each of the plurality of cameras directs their field of view, and wherein a first of the plurality of cameras (1220A) is located on a first sidewall (40) of an arch projecting from the surface (70) and a second of the plurality of cameras (1220B) is located on a second sidewall (50) of the arch, the arch comprising the first sidewall (40), the second sidewall (50), and a panel (60) linking the first sidewall (40) and the second sidewall (50), and wherein the barcode is comprised in a tag, the tag being attached to the item to be processed, wherein the first sidewall comprises a first elongated portion projecting from the panel towards the surface and the first of the plurality of cameras is coupled to the first elongated portion and the second sidewall comprises a second elongated portion projecting towards the surface, a length of the first elongated portion and a length of the second elongated portion being less than a distance defined from a face of the panel to the surface and the second of the plurality of cameras is coupled to the second elongated portion, a third of the plurality of cameras being coupled to the face of the panel opposing the surface.

18. An article handling system comprising a system for reading a tag comprising a barcode, the tag being attached to an item to be processed, the system comprising an arch projecting from a surface (70), the arch comprising a first sidewall (40), a second sidewall (50), and a panel (60) linking the first sidewall and the second sidewall, wherein the first sidewall (40) comprises a first elongated portion projecting from the panel (60) towards the surface (70) and wherein the second sidewall (40) comprises a second elongated portion projecting towards the surface (70), a length of the first elongated portion and a length of the second elongated portion being less than a distance defined from a face of the panel to the surface;

a plurality of cameras (1220A-D) each having a field of view directed towards the surface (70) from differing angles, wherein a first of the plurality of cameras (1220A) is located on the first sidewall (40) and coupled to the first elongated portion and a second of the plurality of cameras (1220B) is located on the second sidewall (50) and coupled to the second elongated portion, wherein a third of the plurality of cameras is coupled to the face of the panel opposing the surface; and processing means configured to read the barcode using the plurality of cameras, the item to be processed being disposed on the surface to which each of the plurality of cameras directs their field of view.

19. The article handling system of claim 18 further comprising a belt or conveyor for conveying an article associated with the tag.

20. The article handling system of claim 18 wherein the device is configured to generate a signal configured to trigger a belt or conveyor of an article handling system in response to reading the barcode.

* * * * *